US008427100B2

(12) United States Patent
Vorenkamp et al.

(10) Patent No.: US 8,427,100 B2
(45) Date of Patent: Apr. 23, 2013

(54) INCREASING EFFICIENCY OF WIRELESS POWER TRANSFER

(75) Inventors: Pieter Vorenkamp, Laguna Niguel, CA (US); Reinier Van Der Lee, Lake Forest, CA (US); InSun Van Loo, Wijchen (NL)

(73) Assignee: Broadcom Corporation, Irvine, CA (US)

(*) Notice: Subject to any disclaimer, the term of this patent is extended or adjusted under 35 U.S.C. 154(b) by 447 days.

(21) Appl. No.: 12/580,689

(22) Filed: Oct. 16, 2009

(65) Prior Publication Data

US 2010/0201313 A1 Aug. 12, 2010

Related U.S. Application Data

(63) Continuation-in-part of application No. 12/421,762, filed on Apr. 10, 2009.

(60) Provisional application No. 61/150,554, filed on Feb. 6, 2009.

(51) Int. Cl.
*H02J 7/04* (2006.01)
*H02J 7/00* (2006.01)

(52) U.S. Cl.
USPC ........... 320/108; 320/107; 320/114; 320/156; 320/158; 320/162

(58) Field of Classification Search .................. 320/108, 320/104, 155, 156, 157, 158, 159, 160, 162, 320/163, 164, 165
See application file for complete search history.

(56) References Cited

U.S. PATENT DOCUMENTS

| | | | | |
|---|---|---|---|---|
| 3,938,018 | A | 2/1976 | Dahl | |
| 4,873,677 | A | 10/1989 | Sakamoto et al. | |
| 5,455,466 | A | 10/1995 | Parks et al. | |
| 5,734,254 | A | 3/1998 | Stephens | |
| 5,812,643 | A | 9/1998 | Schelberg, Jr. et al. | |
| 5,952,814 | A | 9/1999 | Van Lerberghe | |
| 5,959,433 | A | 9/1999 | Rohde | |
| 6,067,008 | A | 5/2000 | Smith | |
| 6,114,832 | A | 9/2000 | Lappi et al. | |
| 6,275,143 | B1 | 8/2001 | Stobbe | |
| 6,384,578 | B1 | 5/2002 | Patino et al. | |
| 6,463,305 | B1 | 10/2002 | Crane | |
| 6,756,765 | B2 | 6/2004 | Bruning | |
| 7,009,362 | B2 | 3/2006 | Tsukamoto et al. | |
| 7,042,196 | B2 | 5/2006 | Ka-Lai et al. | |
| 7,375,492 | B2 * | 5/2008 | Calhoon et al. | 320/108 |
| 7,378,817 | B2 | 5/2008 | Calhoon et al. | |

(Continued)

*Primary Examiner* — Edward Tso
*Assistant Examiner* — Alexis Boateng
(74) *Attorney, Agent, or Firm* — Fiala & Weaver P.L.L.C.

(57) ABSTRACT

Techniques are described herein that are capable of increasing efficiency of wireless power transfer. A wireless power transfer system includes features that allow the system to be deployed in public spaces such as airports or in commercial establishments such as restaurants or hotels to allow a user to recharge one or more portable electronic devices while away from home. To accommodate wireless recharging of a variety of device types and states, the system may receive parameters and/or state information associated with a portable electronic device to be recharged and may control the wireless power transfer in accordance with such parameters and/or state information. For instance, the system may increase efficiency of the wireless power transfer based on such parameters and/or state information. The system may also provide a secure and efficient means for obtaining required payment information from the user prior to the wireless power transfer, thereby facilitating fee-based recharging.

21 Claims, 25 Drawing Sheets

U.S. PATENT DOCUMENTS 7,683,572 B2 3/2010 Toya
7,750,598 B2 7/2010 Hoffman et al.
7,786,419 B2 8/2010 Hyde et al.
8,004,235 B2 * 8/2011 Baarman et al. .............. 320/108
8,060,011 B2 * 11/2011 Jin .............................. 455/41.1
8,103,313 B2 1/2012 Enmei
2004/0145342 A1 * 7/2004 Lyon ............................ 320/108
2005/0127869 A1 6/2005 Calhoon et al.
2005/0134213 A1 6/2005 Takagi et al.
2007/0082715 A1 * 4/2007 Rofougaran et al. ......... 455/574
2007/0222542 A1 9/2007 Joannopoulos et al.
2007/0228833 A1 10/2007 Stevens et al.
2008/0111518 A1 * 5/2008 Toya ............................ 320/108
2008/0197802 A1 * 8/2008 Onishi et al. .................. 320/106
2008/0238364 A1 * 10/2008 Weber et al. .................. 320/108
2008/0258679 A1 10/2008 Manico et al.
2008/0272889 A1 11/2008 Symons
2008/0297107 A1 * 12/2008 Kato et al. .................... 320/108
2009/0096413 A1 4/2009 Partovi et al.
2009/0102296 A1 4/2009 Greene et al.
2009/0133942 A1 * 5/2009 Iisaka et al. ..................... 178/43
2009/0134713 A1 * 5/2009 Stevens et al. ................ 307/104
2009/0146608 A1 6/2009 Lee
2009/0206791 A1 8/2009 Jung
2009/0230777 A1 9/2009 Baarman et al.
2009/0276700 A1 11/2009 Anderson et al.
2009/0284245 A1 * 11/2009 Kirby et al. .................. 323/318
2010/0036773 A1 * 2/2010 Bennett ........................... 705/67
2010/0201310 A1 8/2010 Vorenkamp et al.
2010/0201513 A1 8/2010 Vorenkamp et al.
2011/0210696 A1 * 9/2011 Inoue ........................... 320/108

* cited by examiner

INCREASING EFFICIENCY OF WIRELESS POWER TRANSFER

CROSS-REFERENCE TO RELATED APPLICATIONS

This application is a continuation-in-part of U.S. patent application Ser. No. 12/421,762, filed Apr. 10, 2009, which claims the benefit of U.S. Provisional Application No. 61/150,554, filed Feb. 6, 2009, the entireties of which are incorporated by reference herein.

BACKGROUND OF THE INVENTION

1. Field of the Invention

The invention generally relates to systems capable of transmitting electrical power without wires.

2. Background

As used herein, the term wireless power transfer refers to a process by which electrical energy is transmitted from a power source to an electrical load without interconnecting wires. Wireless power transfer is useful for applications in which instantaneous or continuous energy transfer is needed, but for which providing a wired connection is inconvenient, hazardous, or impossible.

It has been observed that while electromagnetic radiation (such as radio waves) is excellent for transmitting information wirelessly, it is generally not suitable for transferring power wirelessly. For example, if power were transferred using omnidirectional electromagnetic waves, a vast majority of the power would end up being wasted in free space. Directed electromagnetic radiation such as lasers might be used to transfer power between a power source and a device, but this is not very practical and could even be dangerous. Such an approach would also require an uninterrupted line of sight between the power source and the device, as well as a sophisticated tracking mechanism when the device is mobile.

For the foregoing reasons, conventional systems that transfer power wirelessly are typically based on the concept of electromagnetic induction rather than electromagnetic radiation. These systems include systems based on inductive coupling and systems based on so-called "resonant inductive coupling."

Inductive coupling refers to the transfer of energy from one circuit component to another through a shared electromagnetic field. In inductive coupling, a current running in an emitting coil induces another current in a receiving coil. The two coils are in close proximity, but do not touch.

Inductive coupling has been used in a variety of systems, including but not limited to systems that wirelessly charge a battery in a portable electronic device. In such systems, the portable electronic device is placed in close proximity to a charging station. A first induction coil in the charging station is used to create an alternating electromagnetic field, and a second induction coil in the portable electronic device derives power from the electromagnetic field and converts it back into electrical current to charge the battery. Thus, in such systems, there is no need for direct electrical contact between the battery and the charging station.

Some examples of various different types of charging systems based on the principle of inductive coupling are described in U.S. Pat. No. 3,938,018 to Dahl, entitled "Induction Charging System," U.S. Pat. No. 4,873,677 to Sakamoto et al., entitled "Charging Apparatus for an Electronic Device," U.S. Pat. No. 5,952,814 to Van Lerberghe, entitled "Induction Charging Apparatus and an Electronic Device," U.S. Pat. No. 5,959,433 to Rohde, entitled "Universal Inductive Battery Charger System," and U.S. Pat. No. 7,042,196 to Ka-Lai et al., entitled "Contact-less Power Transfer," each of which is incorporated by reference as if fully set forth herein. Examples of some conventional devices that include batteries that may be recharged via inductive coupling include the Braun Oral B Plak Control Power Toothbrush, the Panasonic Digital Cordless Phone Solution KX-PH15AL and the Panasonic multi-head men's shavers ES70/40 series.

Another example of a technology that supports the use of inductive coupling to wirelessly transfer power is called Near Field Communication (NFC). NFC is a short-range high frequency wireless communication technology that enables the exchange of data between devices over approximately a decimeter distance. NFC is an extension of the ISO/IEC 14443 proximity-card standard that combines the interface of a smartcard and a reader into a single device. An NFC device can communicate with both existing ISO/IEC 14443 smartcards and readers, as well as with other NFC devices, and is thereby compatible with existing contactless infrastructure already in use for public transportation and payment. The air interface for NFC is described in ISO/IEC 18092/ECMA-340: Near Field Communication Interface and Protocol-1 (NFCIP-1) and ISO/IEC 21481/ECMA-352: Near Field Communication Interface and Protocol-2 (NFCIP-2), which are incorporated by reference herein.

NFC devices communicate via magnetic field induction, wherein two loop antennas are located within each other's near field, effectively forming an air-core transformer. In a passive communication mode, an initiator device provides a carrier field and a target device answers by modulating the existing field. In this mode, the target device may draw its operating power from the initiator-provided electromagnetic field.

"Resonant inductive coupling" refers to a more recently-publicized type of inductive coupling that utilizes magnetically-coupled resonators for wirelessly transferring power. In a system that uses resonant inductive coupling, a first coil attached to a sending unit generates a non-radiative magnetic field oscillating at megahertz (MHz) frequencies. The non-radiative field mediates a power exchange with a second coil attached to a receiving unit, which is specially designed to resonate with the field. The resonant nature of the process facilitates a strong interaction between the sending unit and the receiving unit, while the interaction with the rest of the environment is weak. Power that is not picked up by the receiving unit remains bound to the vicinity of the sending unit, instead of being radiated into the environment and lost.

Resonant inductive coupling is said to enable relatively efficient wireless power transfer over distances that are a few times the size of the device to be powered, therefore exceeding the performance of systems based on non-resonant inductive coupling. An example of a wireless power transfer system based on resonant inductive coupling is described in U.S. Patent Application Publication No. 2007/0222542 to Joannopoulos et al., entitled "Wireless Non-radiative Energy Transfer," which is incorporated by reference herein.

Given the explosive growth in the use of portable electronic devices such as laptop computers, cellular telephones, and portable media devices, it is anticipated that there will be a strong demand for systems that facilitate the wireless recharging of power sources based on various types of near field inductive coupling such as those described above. Indeed, it may be deemed desirable to make such systems available in public spaces such as airports or in commercial establishments such as restaurants or hotels to allow users to recharge their portable electronic devices while away from home.

Such wireless transfer of power in public or commercial environments may be made available to users for a fee. However, in order to achieve this, the wireless power transfer system must provide a secure and efficient way of obtaining requisite payment information from a user prior to performing the wireless power transfer. Still further, to accommodate wireless recharging of a variety of device types and states, the desired system should be able to receive parameters and/or state information associated with a portable electronic device to be recharged and to control the wireless power transfer in accordance with such parameters and/or state information.

Unfortunately, none of the foregoing systems based on inductive coupling or resonant inductive coupling provide such features. For example, although NFC devices may use magnetic field induction to wirelessly transfer power as well as payment information and other types of data, it does not appear that such NFC devices are designed to use the wirelessly transferred power to recharge a power source associated with a portable electronic device. Furthermore, it does not appear that such devices control the wireless power transfer based on parameters and/or state information received from the portable electronic device having a power source to be recharged. Moreover, conventional techniques for transferring power wirelessly do not allow for feedback to increase efficiency of the wireless power transfer.

BRIEF SUMMARY OF THE INVENTION

A system and/or method for increasing efficiency of wireless power transfer, substantially as shown in and/or described in connection with at least one of the figures, as set forth more completely in the claims.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIGS. 10, 12, 14, and 16 are block diagrams of example implementations of a charging station in accordance with embodiments described herein.

FIGS. 11A-11D depict respective portions of a flowchart of a method for increasing efficiency of wireless power transfer in accordance with an embodiment described herein.

FIGS. 13, 15, and 17-21 depict flowcharts of methods for increasing efficiency of wireless power transfer in accordance with embodiments described herein.

Figure 22:
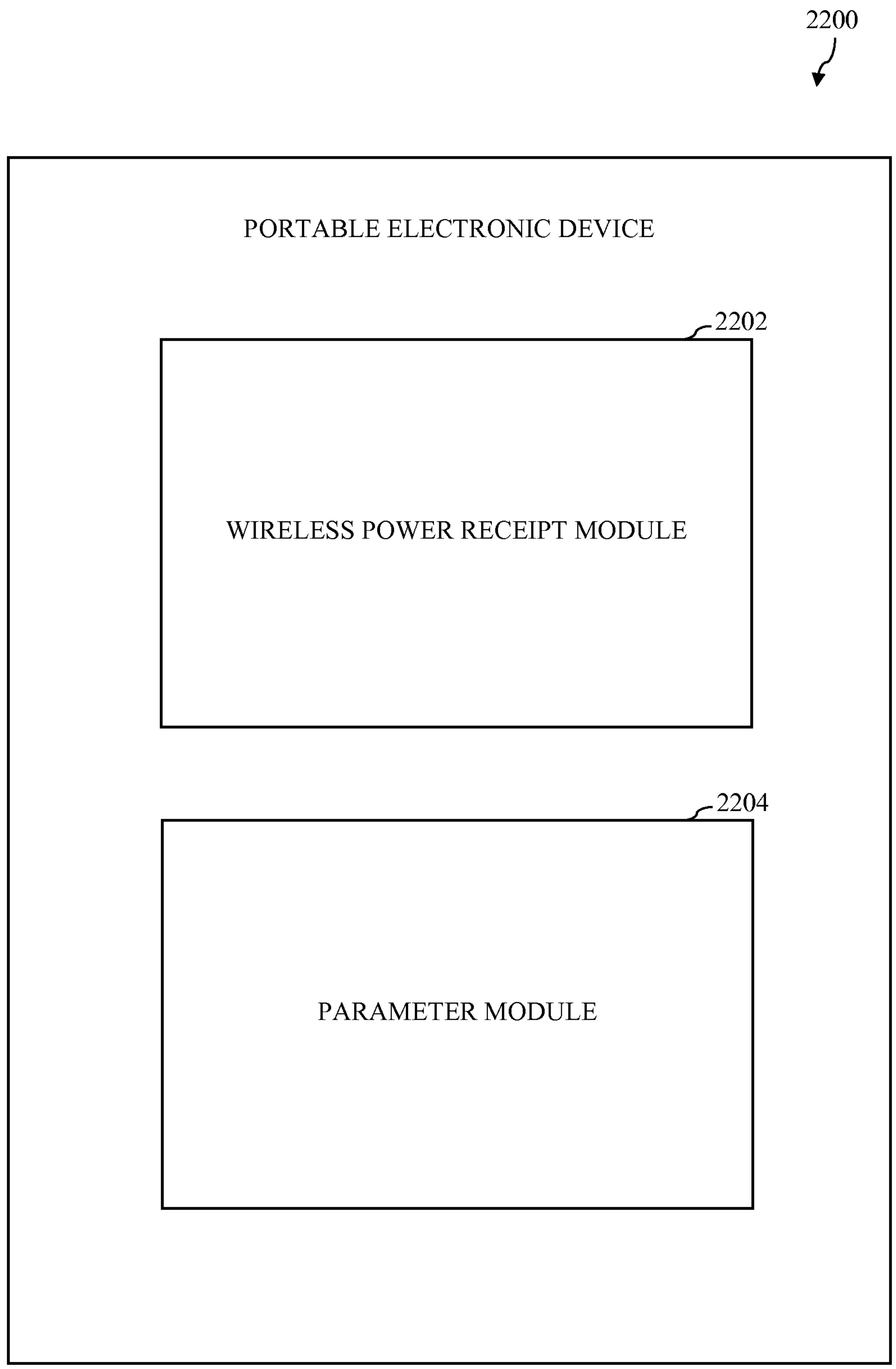

FIG. 22 is a block diagram of an example implementation of a portable electronic device in accordance with an embodiment described herein.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate example embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Various approaches are described herein for, among other things, increasing efficiency of wireless power transfer. The efficiency of a wireless power transfer is defined as the magnitude of power that is consumed by a portable electronic device with respect to the wireless power transfer divided by the magnitude of power that is provided to the portable electronic device with respect to the wireless power transfer. The efficiency of the wireless power transfer therefore indicates the proportion of the power that is wirelessly transferred to the portable electronic device that is consumed by the portable electronic device.

For example, a charging station may begin to wirelessly transfer power to a portable electronic device via a wireless power link. The portable electronic device may be configured to send an indicator to the charging station via a wireless communication link once the charging station begins to wirelessly transfer the power to the portable electronic device. The indicator specifies information regarding the portable electronic device, which may include but is not limited to a resonant frequency of the portable electronic device, a magnitude of power requested by the portable electronic device, a magnitude of power consumed by the portable electronic power with respect to the wireless power transfer, a maximum safe power that the portable electronic device is capable of consuming without substantial risk of damaging the portable electronic device, a position of the portable electronic device, etc. The charging station may be configured to increase the efficiency of the wireless transfer of the power based on the indicator.

A method is described for increasing efficiency of wireless power transfer. In accordance with this method, a wireless power transfer is initiated from a charging station to a portable electronic device via a wireless power link. Parameter(s) regarding the portable electronic device are received at the charging station via a wireless communication link in response to initiation of the wireless power transfer. Efficiency of the wireless power transfer is increased based on the parameter(s).

Another method is described for increasing efficiency of wireless power transfer. In accordance with this method, power is wirelessly transferred to a portable electronic device via a wireless power link. Parameter(s) received via a wireless communication link regarding the portable electronic device with respect to the wireless transfer of the power are analyzed. Efficiency with respect to the wireless transfer of the power is increased based on analysis of the parameter(s).

Yet another method is described for increasing efficiency of wireless power transfer. In accordance with this method, power is wirelessly received for a first period of time at a portable electronic device from a charging station via a wireless power link having a first transmission efficiency. Parameter(s) regarding the portable electronic device with respect to receipt of the power during the first period of time are provided to the charging station via a wireless communication link. Power is wirelessly received for a second period of time at the portable electronic device from the charging station via the wireless power link having a second transmission efficiency in response to providing the parameter(s) to the charging station. The second transmission efficiency is greater than the first transmission efficiency.

A system is described that includes a wireless power transfer module, a parameter receipt module, and an efficiency improvement module. The wireless power transfer module is configured to initiate a wireless power transfer to a portable electronic device via a wireless power link. A parameter receipt module is configured to receive parameter(s) regarding the portable electronic device via a wireless communication link in response to initiation of the wireless power transfer. An efficiency improvement module is configured to increase efficiency of the wireless power transfer based on the parameter(s).

Another system is described that includes a wireless power transfer module, a parameter analysis module, and an efficiency improvement module. The wireless power transfer module is configured to wirelessly transfer power to a portable electronic device via a wireless power link. The parameter analysis module is configured to analyze parameter(s) received via a wireless communication link regarding the portable electronic device with respect to the wireless transfer of the power. The efficiency improvement module is configured to increase efficiency with respect to the wireless transfer of the power based on analysis of the parameter(s).

Yet another system is described that includes a wireless power receipt module and a parameter module. The wireless power receipt module is configured to wirelessly receive power for a first period of time from a charging station via a wireless power link having a first transmission efficiency. The parameter module is configured to provide parameter(s) regarding the system with respect to receipt of the power during the first period of time to the charging station via a wireless communication link. The wireless power receipt module is further configured to wirelessly receive power for a second period of time from the charging station via the wireless power link having a second transmission efficiency in response to providing the parameter(s) to the charging station. The second transmission efficiency is greater than the first transmission efficiency.

II. Example Wireless Power Transfer System in Accordance with an Embodiment

Figure 1:
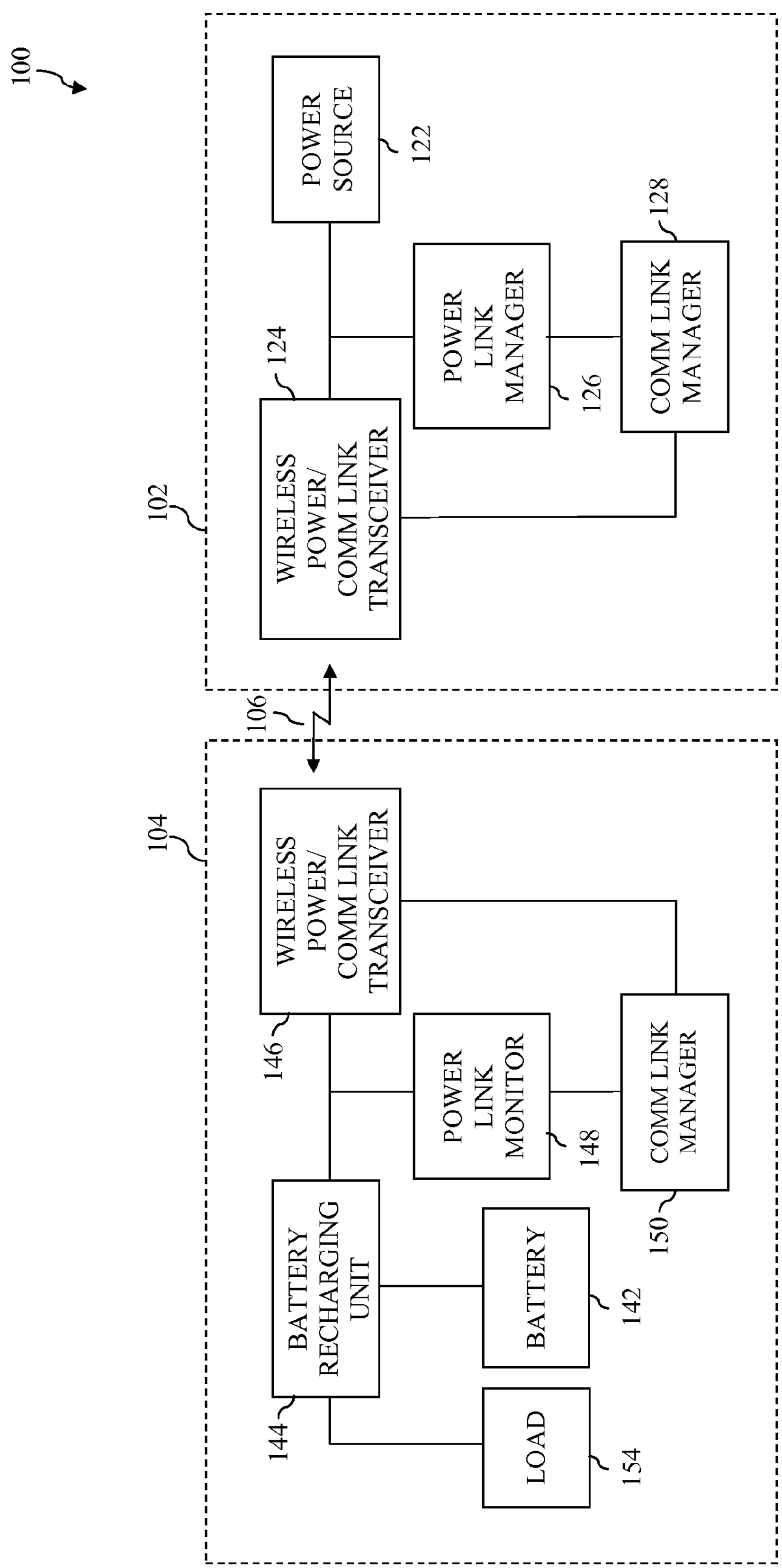
FIG. 1 is a block diagram of an example wireless power transfer system in accordance with an embodiment described herein.

FIG. 1 is a block diagram of an example wireless power transfer system 100 in accordance with an embodiment described herein. System 100 includes a charging station 102 and a portable electronic device 104. As will be described in more detail herein, charging station 102 is configured to wirelessly transfer power to portable electronic device 104 responsive to receipt of payment information therefrom. Charging station 102 is also configured to manage the wireless transfer of power to portable electronic device 104 based on certain parameters and/or state information received from portable electronic device 104.

As shown in FIG. 1, charging station 102 includes a power source 122 connected to a wireless power/communication link transceiver 124. Wireless power/communication link transceiver 124 is configured to wirelessly transfer power supplied by power source 122 to a wireless power/communication link transceiver 146 associated with portable electronic device 104 via an inductive link 106. As will be appreciated by persons skilled in the relevant art(s), such wireless power transfer may be carried out over inductive link 106 in accordance with the well-known principles of inductive coupling or resonant inductive coupling as discussed in the Background Section above. As will be further appreciated by persons skilled in the relevant art(s), the manner in which wireless power/communication link transceiver 124 and wireless power/communication link transceiver 146 are implemented will depend on the type of inductive coupling used. A variety of transceiver designs based on inductive coupling and resonant inductive coupling are available in the art and thus need not be described herein.

Charging station 102 also includes a power link manager 126 connected between power source 122 and wireless power/communication link transceiver 124. Power link manager 126 is configured to sense when wireless power/communication link transceiver 146 associated with portable electronic device 104 is inductively coupled to wireless power/communication link transceiver 124 and is thus capable of receiving power wirelessly therefrom. Power link manager 126 is further configured to transfer power wirelessly over inductive link 106 responsive to control signals from a communication link manager 128. Power link manager 126 may be further configured to monitor the amount of power that is wirelessly transferred via inductive link 106 to portable electronic device 104.

Communication link manager 128 is connected both to power link manager 126 and to wireless power/communication link transceiver 124. Communication link manager 128 is configured to establish and maintain a wireless communication link with portable electronic device 104 via wireless power/communication link transceiver 124 for the purpose of obtaining payment information and other information therefrom. Such other information may include, for example, device-specific parameters associated with portable electronic device 104 such as a maximum safe power that may be transferred to portable electronic device 104. Such other information may also include, for example, state information associated with portable electronic device 104 such an amount of power currently consumed or needed by portable electronic device 104.

Communication link manager 128 is thus configured to use inductive link 106 for the wireless communication of data. Depending upon the implementation, communication link manager 128 may be configured to carry out the wireless communication of data in accordance with any standard or proprietary induction-based data communication protocol. For example, communication link manager 128 may be configured to carry out the wireless communication of data in accordance with an NFC protocol as described in the Background Section above, although this example is not intended to be limiting and other standard or proprietary induction-based data communication protocols may be used.

Communication link manager 128 is further configured to transmit control signals to power link manager 126 to control whether and when power link manager 126 may transfer power wirelessly to portable electronic device 104. Communication link manager 128 can thus ensure that power is transferred to portable electronic device 104 only after requisite payment information has been received from portable electronic device 104. Communication link manager 128 can also control power link manager 126 to ensure that power is delivered to portable electronic device 104 in a manner that takes into account certain device-specific parameters such as a maximum safe power that may be transferred to portable electronic device 104 or state information such as an amount of power currently consumed or needed by portable electronic device 104.

Portable electronic device 104 within power transfer system 100 will now be described. As shown in FIG. 1, portable electronic device 104 includes a battery recharging unit 144 connected to wireless power/communication link transceiver 146. Wireless power/communication link transceiver 146 is configured to transfer wireless power received over inductive link 106 to battery recharging unit 144, which is configured to use such power to recharge a battery 142 connected thereto. Battery recharging unit 144 is also connected to a load 154 associated within portable electronic device 104, which can be powered by battery 142 in a well-known manner.

Portable electronic device 104 further includes a power link monitor 148 connected between wireless power/communication link transceiver 146 and battery recharging unit 144. Power link monitor 148 may be configured to monitor an amount of power that is wirelessly received via inductive link 106 and to provide this information to a communication link manager 150. Power link monitor 148 may provide other state information to communication link manager 150 including, for example, a current state of battery 142.

Communication link manager 150 is connected both to power link monitor 148 and to wireless power/communication link transceiver 146. Communication link manager 150 is configured to establish and maintain a wireless communication link with charging station 102 via wireless power/communication link transceiver 146 for the purpose of providing payment information and other information thereto. As noted above, such other information may include, for example, device-specific parameters associated with portable electronic device 104, such as a maximum safe power that may be transferred to portable electronic device 104, or state information associated with portable electronic device 104 such an amount of power currently consumed or needed by portable electronic device 104. This state information may be based on or derived from state information provided by power link monitor 148.

Communication link manager 150 is thus configured to use inductive link 106 for the wireless communication of data. Depending upon the implementation, communication link manager 150 may be configured to carry out the wireless communication of data in accordance with any standard or proprietary induction-based data communication protocol. For example, communication link manager 150 may be configured to carry out the wireless communication of data in accordance with an NFC protocol as described in the Background Section above, although this example is not intended to be limiting and other standard or proprietary induction-based data communication protocols may be used.

Figure 2:
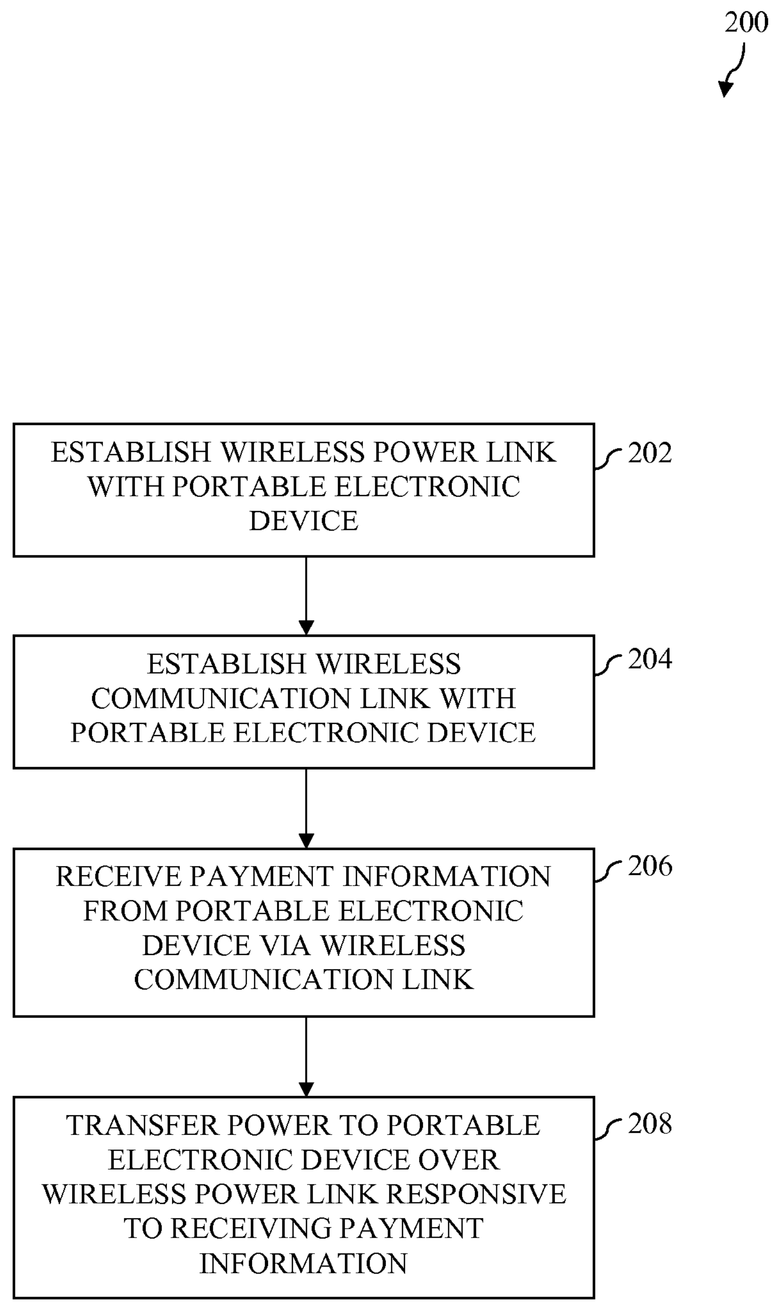
FIG. 2 depicts a flowchart of a method for wirelessly transferring power from a charging station to a portable electronic device in accordance with an embodiment described herein.

FIG. 2 depicts a flowchart 200 of a method for wirelessly transferring power from a charging station to a portable electronic device in accordance with an embodiment described herein. The method of flowchart 200 will now be described in reference to certain elements of example wireless transfer system 100 as described above in reference to FIG. 1. However, the method is not limited to that implementation.

As shown in FIG. 2, the method of flowchart 200 begins at step 202 in which power link manager 126 of charging station 102 establishes a wireless power link with portable electronic device 104. Power link manager 126 performs this function by allowing power to flow from power source 122 to wireless power/communication link transceiver 124, which has the effect of creating inductive link 106 between wireless power/communication link transceiver 124 of charging station 102 and wireless power/communication link transceiver 146 of portable electronic device 104. As discussed above, depending upon the implementation of wireless power/communication link transceiver 124 and wireless power/communication link transceiver 146, inductive link 106 may be created for example based on the principles of inductive coupling or resonant inductive coupling.

At step 204, communication link manager 128 of charging station 102 establishes a wireless communication link with portable electronic device 104. Communication link manager 128 performs this function by transmitting and/or receiving signals via wireless power/communication link transceiver 124 to/from wireless power/communication link transceiver 146 associated with portable electronic device 104. The wireless communication link is thus established via inductive link 106. As discussed above, the wireless communication link may be established in accordance with any standard or proprietary inductance-based data communication protocol.

At step 206, communication link manager 128 of charging station 102 receives payment information from portable electronic device 104 via the wireless communication link. As will be appreciated by persons skilled in the relevant art(s), the type of payment information that is received during step 206 may vary depending on the manner in which the wireless power transfer service is to be paid for by the user of portable electronic device 104.

For example, if the user will pay for the wireless power transfer through the subsequent billing of a credit card account, checking account, or some other account from which funds may be transferred, then the payment information may include a unique account identifier, such as an account number. Alternatively, if the charge to the user will be added to a list of additional charges due from the user (e.g., the charge is to be added to a hotel bill for the user), then the payment information may include a unique identifier of the user.

Furthermore, if the user has already paid for the wireless power transfer, then the payment information may include an electronic token indicating that such payment has occurred. Alternatively, if the user has purchased prepaid credits towards the wireless power transfer, then the payment information may include an electronic funds amount that is currently available to the user/owner for obtaining the service. The electronic funds amount may be stored on portable electronic device 104, or a card inserted or attached to portable electronic device 104.

The foregoing description of the types of payment information that may be received during step 206 are provided by way of example only and are not intended to limit the present invention. Persons skilled in the relevant art(s) will readily appreciate that other types of payment information may be received during step 206 other than or in addition to those types described above.

After the payment information has been received by communication link manager 128 during step 206, communication link manager 128 sends one or more control signals to power link manager 126 and, responsive to receiving the control signal(s), power link manager 126 allows power to be transferred to portable electronic device 104 over the wireless power link. This is generally shown at step 208.

In an embodiment, communication link manager 128 validates and/or processes the payment information prior to sending the control signal(s) to power link manager 126. In another embodiment, communication link manager 128 transmits the payment information to an external entity for validation and/or processing prior to sending the control signal(s) to power link manager 126. For example, communication link manager 128 may provide the payment information to a network interface within charging station 102 (not shown in FIG. 1) for wired or wireless communication to a network entity, such as a server, for processing and/or validation.

In a further implementation of the foregoing method, power link manager 126 monitors or meters the amount of power wirelessly transferred to portable electronic device 104 via the wireless power link. The monitored amount can then be used to charge the user of portable electronic device 104 based on the amount of power transferred. In one embodiment, the monitored amount is transmitted to an external entity so that the user of portable electronic device 104 may be charged based on the monitored amount. The external entity may be, for example, a remote network entity, such as a server, or may be portable electronic device 104.

In the foregoing method of flowchart 200, the establishment of the wireless power link in step 202 may occur before, contemporaneously with, or after the establishment of the wireless communication link in step 204 depending upon the implementation. Furthermore, the establishment of the wireless power link may occur responsive to the establishment of the wireless communication link or vice versa. With respect to the establishment of the wireless communication link, either charging station 102 or portable electronic device 104 may act as the initiator depending upon the implementation.

Figure 3:
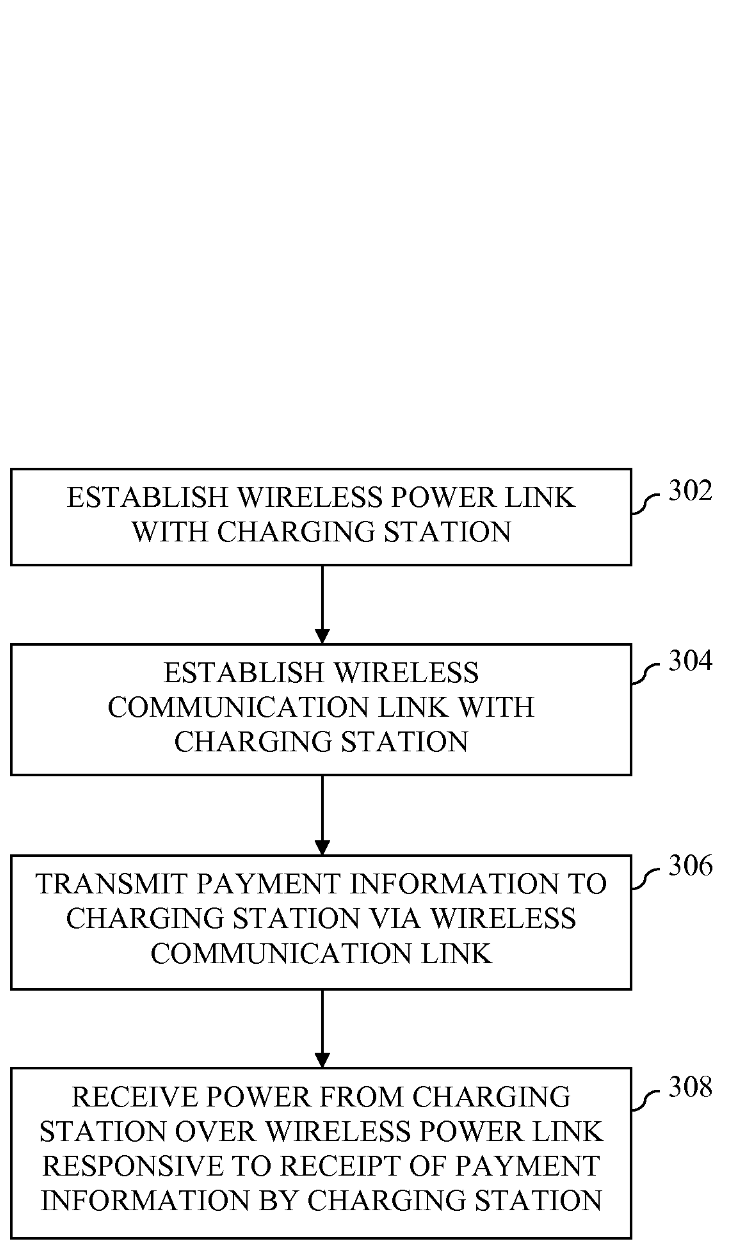
FIG. 3 depicts a flowchart of a method for wirelessly receiving power from a charging station by a portable electronic device in accordance with an embodiment described herein.

FIG. 3 depicts a flowchart 300 of a method for wirelessly receiving power from a charging station by a portable electronic device in accordance with an embodiment described herein. In contrast to the steps of flowchart 200, which are performed by a charging station, the steps of flowchart 300 are performed by a portable electronic device that is configured to interact with a charging station. Thus, the method of flowchart 300 may be thought of as a counterpart method to the method of flowchart 200.

The method of flowchart 300 will now be described in reference to certain elements of example wireless transfer system 100 as described above in reference to FIG. 1. However, the method is not limited to that implementation.

As shown in FIG. 3, the method of flowchart 300 begins at step 302 in which a wireless power link is established between wireless power/communication link transceiver 146 of portable electronic device 104 and wireless power/communication link transceiver 124 of charging station 102. The manner in which such a wireless power link is established was discussed above in reference to step 202 of flowchart 200.

At step 304, communication link manager 150 of portable electronic device 104 establishes a wireless communication link with charging station 102. Communication link manager 150 performs this function by transmitting and/or receiving signals via wireless power/communication link transceiver 146 to/from wireless power/communication link transceiver 124 associated with charging station 102. The wireless communication link is thus established via inductive link 106. As discussed above, the wireless communication link may be established in accordance with any standard or proprietary inductance-based data communication protocol.

At step 306, communication link manager 150 of portable electronic device 104 transmits payment information to charging station 102 via the wireless communication link. As will be appreciated by persons skilled in the relevant art(s), the type of payment information that is transmitted during step 306 may vary depending on the manner in which the wireless power transfer service is to be paid for by the user of portable electronic device 104. Examples of various types of payment information were described above in reference to step 206 of flowchart 200.

Responsive to the receipt of the payment information by charging station 102, charging station 102 transfers power to portable electronic device 104 over the wireless power link. The transferred power is received by wireless power/communication link transceiver 146 and applied to battery recharging unit 144. This is generally shown at step 308.

In the foregoing method of flowchart 300, the establishment of the wireless power link in step 302 may occur before, contemporaneously with, or after the establishment of the wireless communication link in step 304 depending upon the implementation. Furthermore, the establishment of the wireless power link may occur responsive to the establishment of the wireless communication link or vice versa. With respect to the establishment of the wireless communication link, either charging station 102 or portable electronic device 104 may act as the initiator depending upon the implementation.

Figure 4:
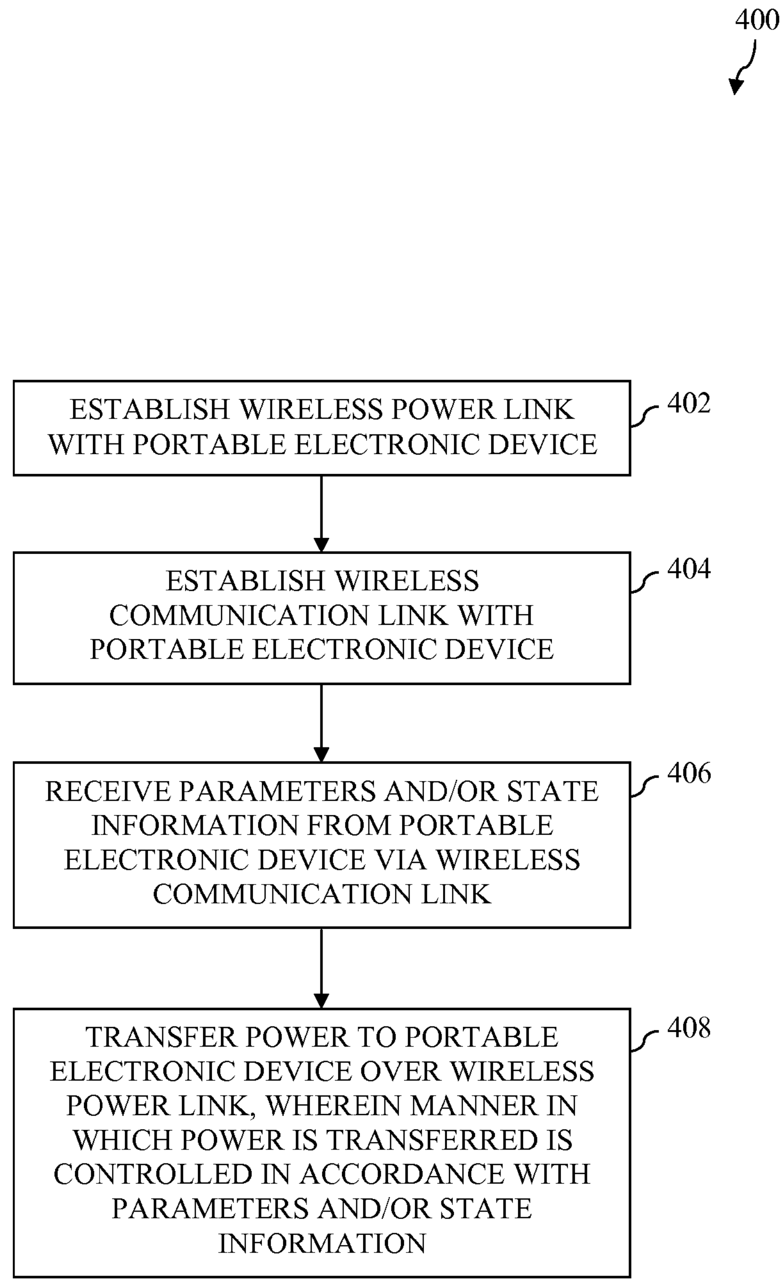
FIG. 4 depicts a flowchart of an additional method for wirelessly transferring power from a charging station to a portable electronic device in accordance with an embodiment described herein.

FIG. 4 depicts a flowchart 400 of an additional method for wirelessly transferring power from a charging station to a portable electronic device in accordance with an embodiment described herein. The method of flowchart 400 will now be described in reference to certain elements of example wireless transfer system 100 as described above in reference to FIG. 1. However, the method is not limited to that implementation.

As shown in FIG. 4, the method of flowchart 400 begins at step 402 in which power link manager 126 of charging station 102 establishes a wireless power link with portable electronic device 104. Power link manager 126 performs this function by allowing power to flow from power source 122 to wireless power/communication link transceiver 124, which has the effect of creating inductive link 106 between wireless power/communication link transceiver 124 of charging station 102 and wireless power/communication link transceiver 146 of portable electronic device 104. As discussed above, depending upon the implementation of wireless power/communication link transceiver 124 and wireless power/communication link transceiver 146, inductive link 106 may be created based on the principles of inductive coupling or resonant inductive coupling for example.

At step 404, communication link manager 128 of charging station 102 establishes a wireless communication link with portable electronic device 104. Communication link manager 128 performs this function by transmitting and/or receiving signals via wireless power/communication link transceiver 124 to/from wireless power/communication link transceiver 146 associated with portable electronic device 104. The wireless communication link is thus established via inductive link 106. As discussed above, the wireless communication link may be established in accordance with any standard or proprietary inductance-based data communication protocol.

At step 406, communication link manager 128 of charging station 102 receives parameters and/or state information from portable electronic device 104 via the wireless communication link. The parameters may include, for example, a maximum safe power that may be transmitted to portable electronic device 104. The state information may include, for example, an amount of power currently consumed or needed by portable electronic device 104.

After receiving the parameters and/or state information, communication link manager 128 sends one or more control signals to power link manager 126 and, responsive to receiving the control signal(s), power link manager 128 transfers power to portable electronic device 104 over the wireless power link in a manner that takes into account the received parameters and/or state information. This is generally shown at step 408.

In one embodiment, controlling the power transfer in accordance with received parameters includes controlling the wireless power link to ensure that the amount of power transferred over the link does not exceed a maximum safe power that may be transmitted to portable electronic device 104. In another embodiment, controlling the power transfer in accordance with received state information includes controlling the wireless power link to ensure that the amount of power that is transferred over the link is sufficient to recharge portable electronic device 104 or does not exceed an amount of power that is sufficient to recharge portable electronic device 104.

In the foregoing method of flowchart 400, the establishment of the wireless power link in step 402 may occur before, contemporaneously with, or after the establishment of the wireless communication link in step 404 depending upon the implementation. Furthermore, the establishment of the wireless power link may occur responsive to the establishment of the wireless communication link or vice versa. With respect to the establishment of the wireless communication link, either charging station 102 or portable electronic device 104 may act as the initiator depending upon the implementation.

Figure 5:
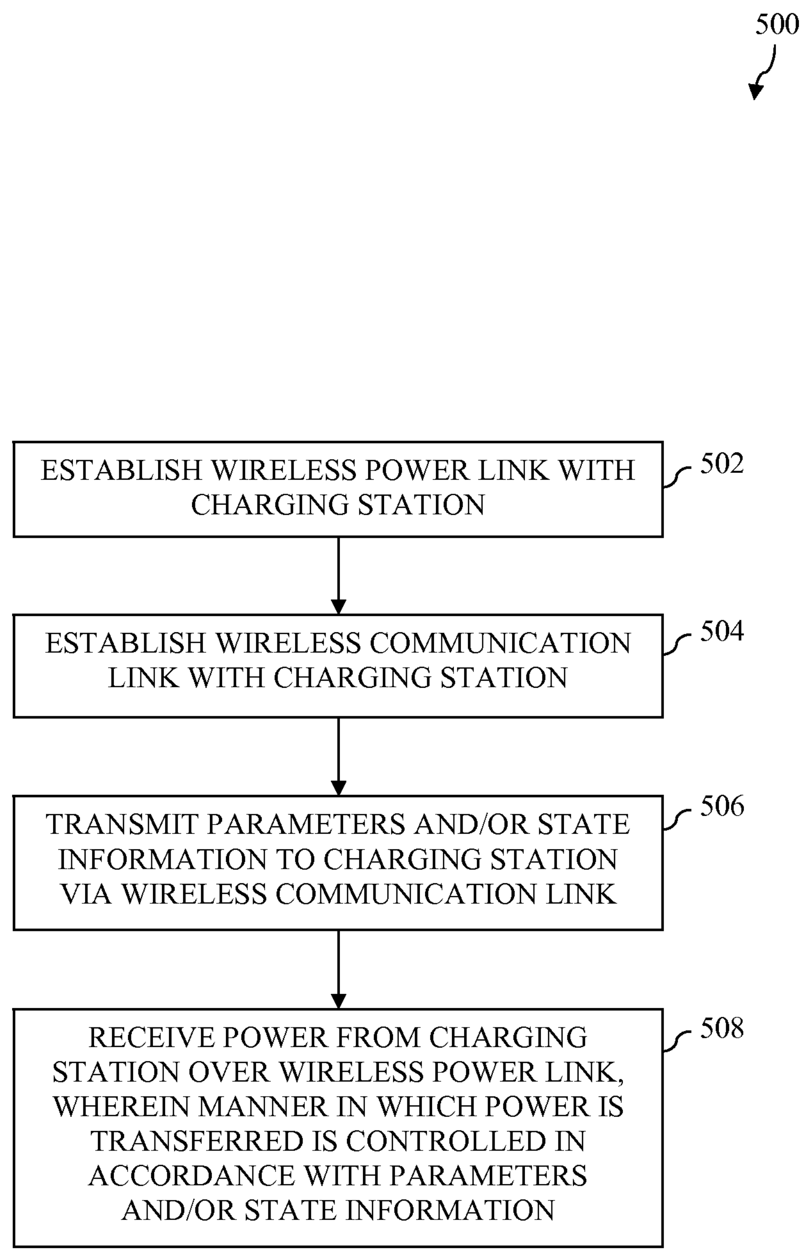
FIG. 5 depicts a flowchart of an additional method for wirelessly receiving power from a charging station by a portable electronic device in accordance with an embodiment described herein.

FIG. 5 depicts a flowchart 500 of a method for wirelessly receiving power from a charging station by a portable electronic device in accordance with an embodiment described herein. In contrast to the steps of flowchart 400, which are performed by a charging station, the steps of flowchart 500 are performed by a portable electronic device that is configured to interact with a charging station. Thus, the method of flowchart 500 may be thought of as a counterpart method to the method of flowchart 400.

The method of flowchart 500 will now be described in reference to certain elements of example wireless transfer system 100 as described above in reference to FIG. 1. However, the method is not limited to that implementation.

As shown in FIG. 5, the method of flowchart 500 begins at step 502 in which a wireless power link is established between wireless power/communication link transceiver 146 of portable electronic device 104 and wireless power/communication link transceiver 124 of charging station 102. The manner in which such a wireless power link is established was discussed above in reference to step 402 of flowchart 400.

At step 504, communication link manager 150 of portable electronic device 104 establishes a wireless communication link with charging station 102. Communication link manager 150 performs this function by transmitting and/or receiving signals via wireless power/communication link transceiver 146 to/from wireless power/communication link transceiver 124 associated with charging station 102. The wireless communication link is thus established via inductive link 106. As discussed above, the wireless communication link may be established in accordance with any standard or proprietary inductance-based data communication protocol.

At step 506, communication link manager 150 of portable electronic device 104 transmits parameters and/or state information to charging station 102 via the wireless communication link. As noted above, the parameters may include, for example, a maximum safe power that may be transmitted to portable electronic device 104 and the state information may include, for example, an amount of power currently consumed or needed by portable electronic device 104.

In an embodiment, communication link manager 150 generates or derives the state information from information collected by power link monitor 148. For example, power link monitor 148 may monitor the wireless power link to determine an amount of power transferred over the link. This amount of power may then be reported as state information to charging station 102 over the wireless communication link. Additionally, power link monitor 148 may provide other state information to communication link manager 150 including, for example, a current state of battery 142.

Responsive to the receipt of the parameters and/or state information by charging station 102, charging station 102 transfers power to portable electronic device 104 over the wireless power link, wherein the manner in which power is transferred is controlled in accordance with the parameters and/or state information. The transferred power is received by wireless power/communication link transceiver 146 and applied to battery recharging unit 144. This is generally shown at step 508.

In the foregoing method of flowchart 500, the establishment of the wireless power link in step 502 may occur before, contemporaneously with, or after the establishment of the wireless communication link in step 504 depending upon the implementation. Furthermore, the establishment of the wireless power link may occur responsive to the establishment of the wireless communication link or vice versa. With respect to the establishment of the wireless communication link, either charging station 102 or portable electronic device 104 may act as the initiator depending upon the implementation.

III. Alternative Wireless Power Transfer System Implementations

Alternative implementations of wireless power transfer system 100 will now be described. Each of the alternative implementations is also capable of wirelessly transferring/receiving power in accordance with the methods of flowcharts 200, 300, 400 and 500 as described above in reference to FIG. 2, FIG. 3, FIG. 4 and FIG. 5, respectively.

Figure 6:
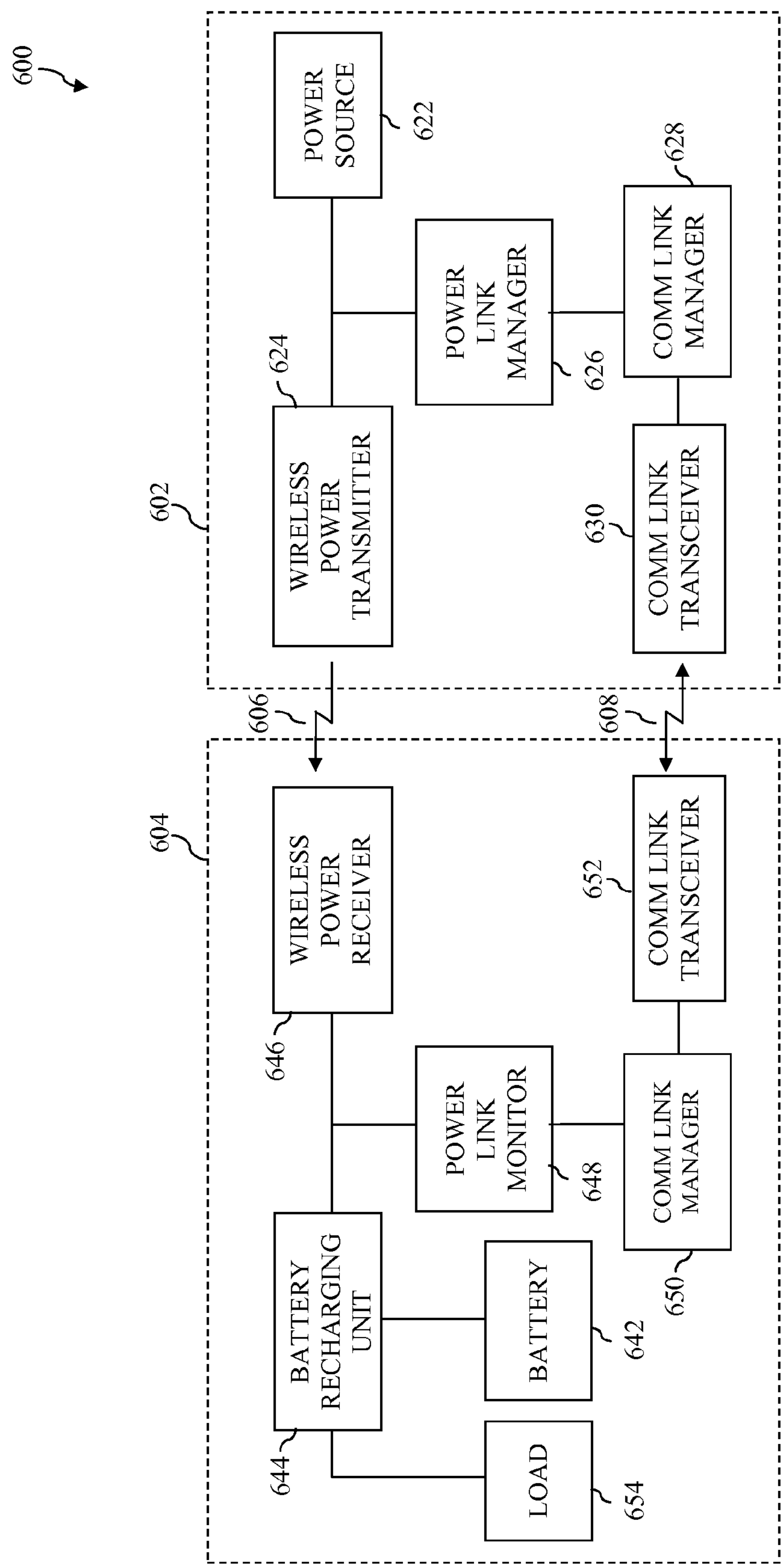
FIG. 6 is a block diagram of a wireless power transfer system in accordance with an embodiment described herein in which a wireless power link is established using a receiver and transmitter and a wireless communication link is established using a separate pair of transceivers.

For example, FIG. 6 is a block diagram of a wireless power transfer system 600 that includes similar elements to those described in reference to FIG. 1 except that the wireless power link between the charging station and the portable electronic device is implemented using a wireless power transmitter and receiver while the wireless communication link between the charging station and the portable electronic device is implemented using a separate pair of communication link transceivers.

As shown in FIG. 6, wireless power transfer system 600 includes a charging station 602 and a portable electronic device 604. Charging station 602 includes a power source 622, a wireless power transmitter 624, a power link manager 626, a communication link manager 628, and a communication link transceiver 630. Portable electronic device 604 includes a battery 642, a battery recharging unit 644, a wireless power receiver 646, a power link monitor 648, a communication link manager 650, a communication link transceiver 652, and a load 654. With the exception of certain elements discussed below, the elements of charging station 602 are configured to function in a similar manner to like-named elements of charging station 102 of FIG. 1. Likewise, with the exception of certain elements discussed below, the elements of portable electronic device 604 are configured to function in a similar manner to like-named elements of portable electronic device 104 of FIG. 1.

Wireless power transmitter 624 is configured to operate under the control of power link manager 626 to wirelessly transfer power supplied by power source 622 to wireless power receiver 646 associated with portable electronic device 604 via an inductive link 606. The wireless power transfer may be carried out over inductive link 606 in accordance with the well-known principles of inductive coupling or resonant inductive coupling as discussed in the Background Section above. The manner in which wireless power transmitter 624 and wireless power receiver 646 are implemented will depend on the type of inductive coupling used. A variety of transmitter and receiver designs based on inductive coupling and resonant inductive coupling are available in the art and thus need not be described herein.

In the embodiment shown in FIG. 6, communication link transceivers 630 and 652 are used to establish and maintain a wireless communication link 608 between charging station 602 and portable electronic device 604 that is separate from inductive link 606. Wireless communication link 608 is established for the purpose of transferring payment information and/or device-specific parameters or state information from portable electronic device 604 to charging station 602. Charging station 602 may then use such information in a like manner to that described above with respect to charging station 102 of FIG. 1.

As will be appreciated by persons skilled in the relevant art(s), the manner in which communication link transceivers 630 and 652 are implemented will depend on the type of wireless communication link to be established therebetween. In accordance with one embodiment, wireless communication link 608 may be established using NFC technology as described above in the Background Section. Alternatively, wireless communication link 608 may be established in accordance with certain RF-based short-range communication technologies such as Bluetooth™, as described in the various standards developed and licensed by the Bluetooth™ Special Interest Group, or technologies such as ZigBee® that are based on the IEEE 802.15.4 standard for wireless personal area networks (specifications describing ZigBee are publically available from the ZigBee® Alliance). Still further, wireless communication link 608 may be established in accordance with other RF-based communication technologies such as any of the well-known IEEE 802.11 protocols. However, these examples are not intended to be limiting, and wireless communication link 608 between charging station 602 and portable electronic device 604 may be established using a variety of other standard or propriety communication protocols.

Figure 7:
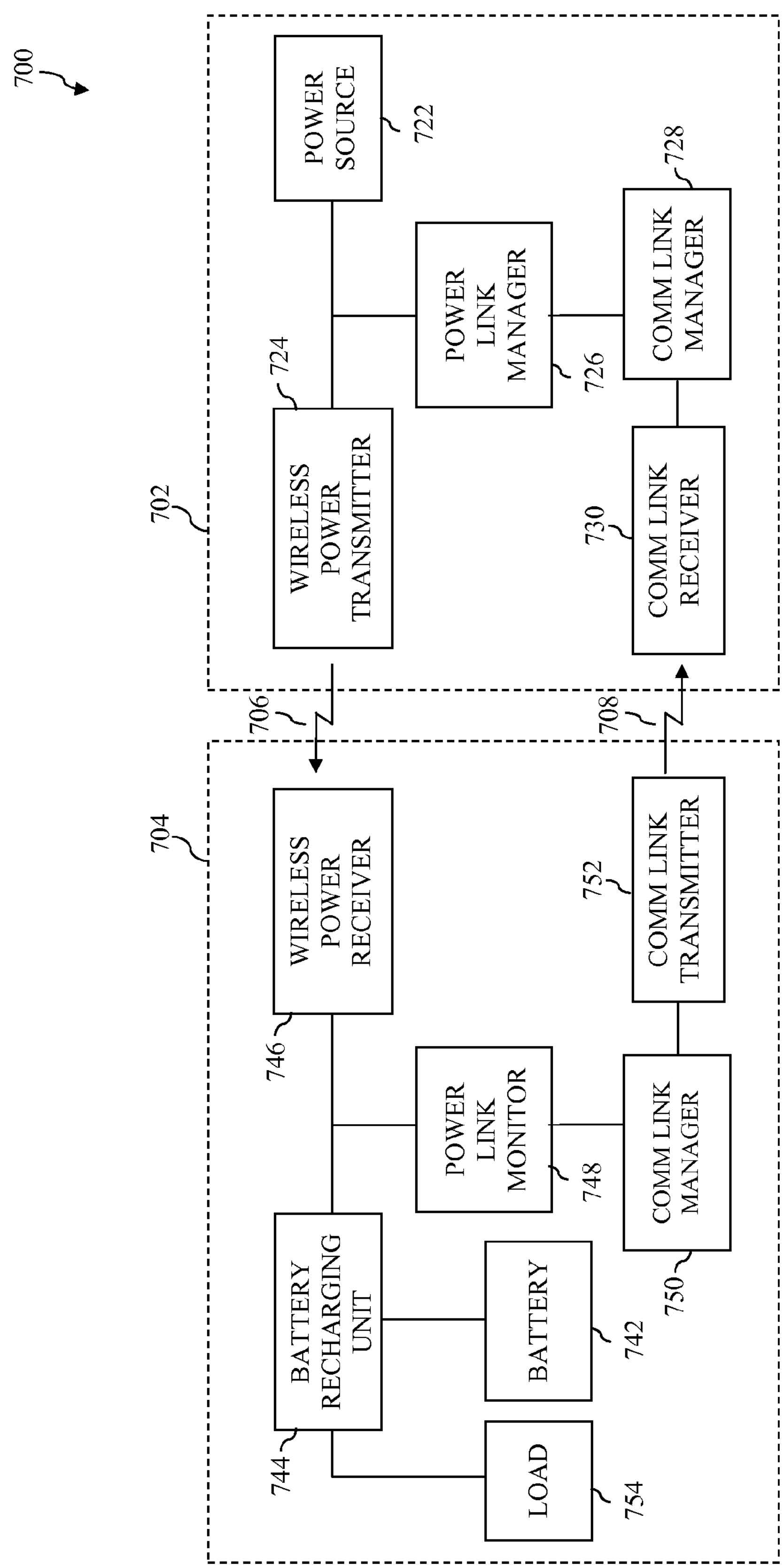
FIG. 7 is a block diagram of a wireless power transfer system in accordance with an alternate embodiment described herein in which a wireless communication link between a portable electronic device and a charging station is unidirectional.

FIG. 7 is a block diagram of a wireless power transfer system 700 that includes similar elements to those described in reference to FIG. 6 except that the wireless communication link between the portable electronic device and the charging station is unidirectional rather than bidirectional.

As shown in FIG. 7, wireless power transfer system 700 includes a charging station 702 and a portable electronic device 704. Charging station 702 includes a power source 722, a wireless power transmitter 724, a power link manager 726, a communication link manager 728, and a communication link receiver 730. Portable electronic device 704 includes a battery 742, a battery recharging unit 744, a wireless power receiver 746, a power link monitor 748, a communication link manager 750, a communication link transmitter 752, and a load 754. With the exception of certain elements discussed below, the elements of charging station 702 are configured to function in a similar manner to like-named elements of charging station 602 of FIG. 6. Likewise, with the exception of certain elements discussed below, the elements of portable electronic device 704 are configured to function in a similar manner to like-named elements of portable electronic device 604 of FIG. 6.

Communication link manager 750 within portable electronic device 704 is configured to establish a unidirectional wireless communication link 708 with charging station 702 by transmitting signals via communication link transmitter 752 to communication link receiver 730. This unidirectional wireless communication link may then be used to transmit payment information and/or device-specific parameters or state information from portable electronic device 704 to charging station 702. Charging station 702 may then use such information in a like manner to that described above with respect to charging station 102 of FIG. 1.

Figure 8:
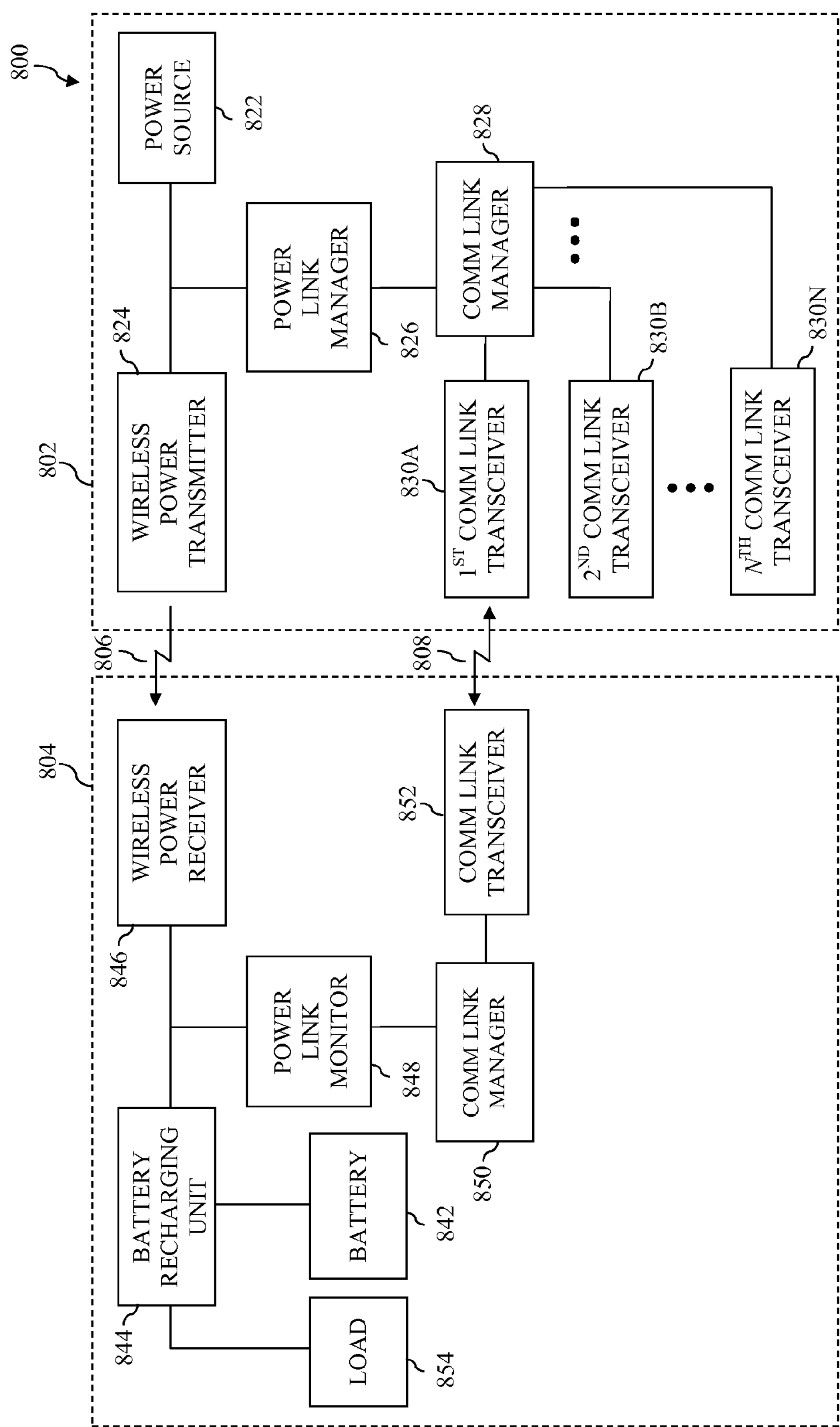
FIG. 8 is a block diagram of a wireless power transfer system in accordance with an alternate embodiment described herein in which a charging station includes a plurality of different communication link transceivers to facilitate the establishment of wireless communication links with a plurality of different types of portable electronic devices.

FIG. 8 is a block diagram of a wireless power transfer system 800 that includes similar elements to those described in reference to FIG. 6 except that the charging station includes a plurality of different communication link transceivers to facilitate the establishment of wireless communication links with a plurality of different types of portable electronic devices.

As shown in FIG. 8, wireless power transfer system 800 includes a charging station 802 and a portable electronic device 804. Charging station 802 includes a power source 822, a wireless power transmitter 824, a power link manager 826, a communication link manager 828, and a plurality of communication link transceivers 830A-830N. Portable electronic device 804 includes a battery 842, a battery recharging unit 844, a wireless power receiver 846, a power link monitor 848, a communication link manager 850, a communication link transceiver 852, and a load 854. With the exception of certain elements discussed below, the elements of charging station 802 are configured to function in a similar manner to like-named elements of charging station 602 of FIG. 6. Likewise, with the exception of certain elements discussed below, the elements of portable electronic device 804 are configured to function in a similar manner to like-named elements of portable electronic device 604 of FIG. 6.

Each of the communication link transceivers 830A-830N is configured for wireless communication in accordance with a different wireless protocol. For example, first communication link transceiver 830A may be configured for communication in accordance with NFC, second communication link transceiver 830B may be configured for communication in accordance with Bluetooth™, and Nth communication link transceiver 830N may be configured for communication in accordance with one of the IEEE 802.11 standards. This advantageously enables charging station 802 to receive payment information and device-specific parameters and/or state information from a plurality of different device types to facilitate the wireless transfer of power to such devices.

IV. Example Embodiments for Increasing Efficiency of Wireless Power Transfer

Some example embodiments are capable of increasing efficiency of wireless power transfer. The efficiency of a wireless power transfer is defined as the magnitude of power that is consumed by a portable electronic device with respect to the wireless power transfer divided by the magnitude of power that is provided to the portable electronic device with respect to the wireless power transfer. The efficiency of the wireless power transfer therefore indicates the proportion of the power that is wirelessly transferred to the portable electronic device that is consumed by the portable electronic device.

In accordance with some example embodiments, a charging station (e.g., charging station 102, 602, 702, or 802) begins to wirelessly transfer power to a portable electronic device (e.g., portable electronic device 104, 604, 704, or 804) via a wireless power link (e.g., link 106, 606, 706, or 806). The portable electronic device sends an indicator to the charging station via a wireless communication link (e.g., link 106, 608, 708, or 808) once the charging station begins to wirelessly transfer the power to the portable electronic device. The indicator specifies information regarding the portable electronic device, which may include but is not limited to a resonant frequency of the portable electronic device, a magnitude of power requested by the portable electronic device, a magnitude of power consumed by the portable electronic power with respect to the wireless power transfer, a maximum safe power that the portable electronic device is capable of consuming without substantial risk of damaging the portable electronic device, a position of the portable electronic device, etc. The charging station increases the efficiency of the wireless transfer of the power based on the indicator.

Figure 9:
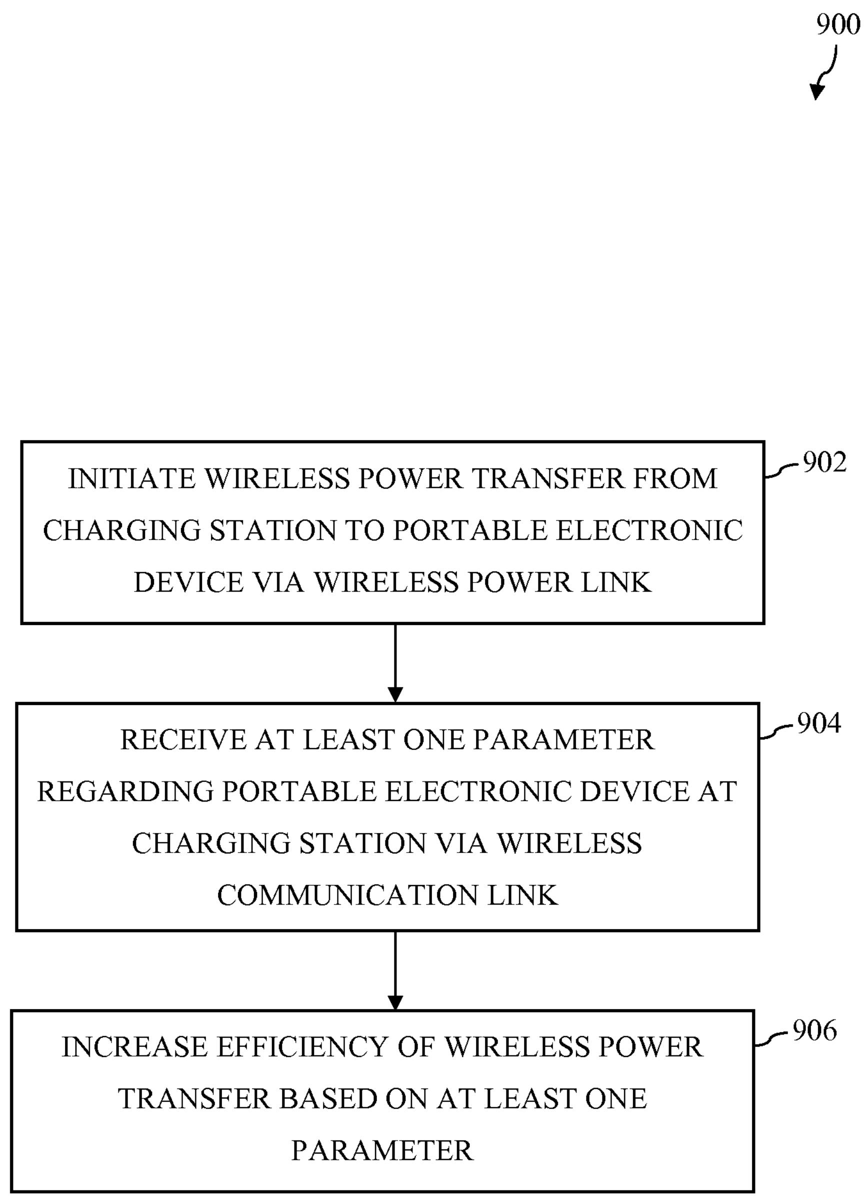
FIG. 9 depicts a flowchart of a method for increasing efficiency of wireless power transfer in accordance with an embodiment described herein.

FIG. 9 depicts a flowchart 900 of a method for increasing efficiency of wireless power transfer in accordance with an embodiment described herein. Flowchart 900 may be performed by charging station 102, 602, 702, or 802 of respective wireless power transfer system 100, 600, 700, or 800 shown in respective FIG. 1, 6, 7, or 8, for example. For illustrative purposes, flowchart 900 is described with respect to a charging system 1000 shown in FIG. 10, which is an example of a charging station 102, 602, 702, or 802, according to an embodiment.

Figure 10:
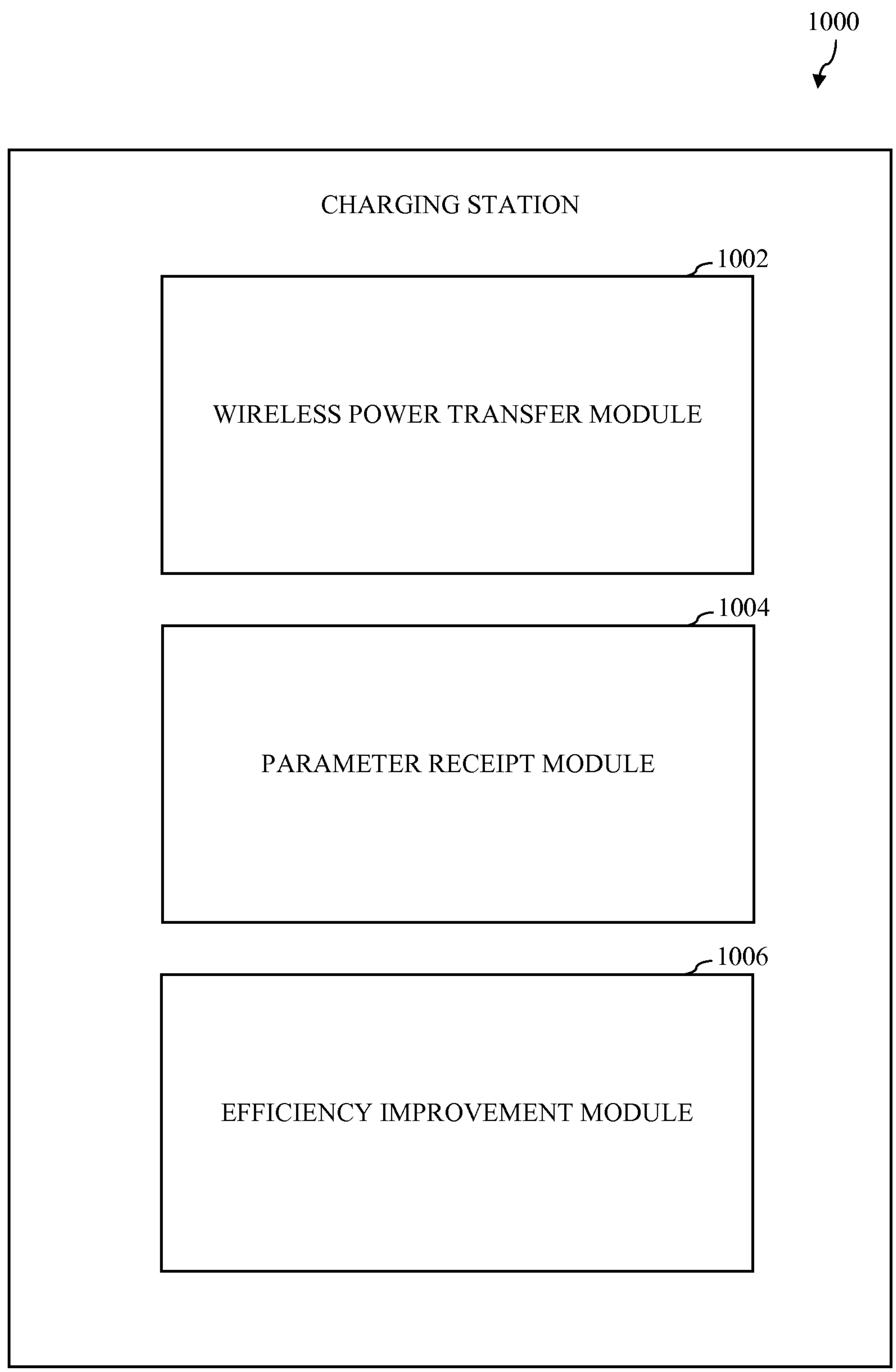

As shown in FIG. 10, charging station 1000 includes a wireless power transfer module 1002, a parameter receipt module 1004, and an efficiency improvement module 1006. Further structural and operational embodiments will be apparent to persons skilled in the relevant art(s) based on the discussion regarding flowchart 900. Flowchart 900 is described as follows.

As shown in FIG. 9, the method of flowchart 900 begins at step 902. In step 902, a wireless power transfer is initiated from a charging station to a portable electronic device via a wireless power link. The wireless power transfer may be performed in accordance with an inductive coupling technique, a resonant inductive coupling technique, or any other suitable technique. In an example implementation, wireless power transfer module 1002 initiates the wireless power transfer via the wireless power link.

At step 904, at least one parameter regarding the portable electronic device is received at the charging station via a wireless communication link. For instance, the at least one parameter may be received via the wireless communication link in accordance with a Near Field Communication (NFC) protocol, a Bluetooth™ protocol, a ZigBee® protocol, an IEEE 802.11 protocol, or any other suitable protocol. The wireless power link and the wireless communication link may be implemented as separate links or as a common link. The wireless power link and the wireless communication link may be inductive links, though the scope of the example embodiments is not limited in this respect. In an example implementation, parameter receipt module 1004 receives the at least one parameter.

At step 906, efficiency of the wireless power transfer is increased based on the at least one first parameter. In an example implementation, efficiency improvement module 1006 increases the efficiency of the wireless power transfer. Some example techniques for increasing the efficiency of wireless power transfer are described below with reference to FIGS. 11A-11D, 12, 15, and 16, for example.

FIGS. 11A-11D depict respective portions of a flowchart 1100 of a method for increasing efficiency of wireless power transfer in accordance with an embodiment described herein. Flowchart 1100 may be performed by charging station 102, 602, 702, or 802 of respective wireless power transfer system 100, 600, 700, or 800 shown in respective FIG. 1, 6, 7, or 8, for example. For illustrative purposes, flowchart 1100 is described with respect to a charging system 1200 shown in FIG. 12, which is an example of a charging station 102, 602, 702, or 802, according to an embodiment.

Figure 12:
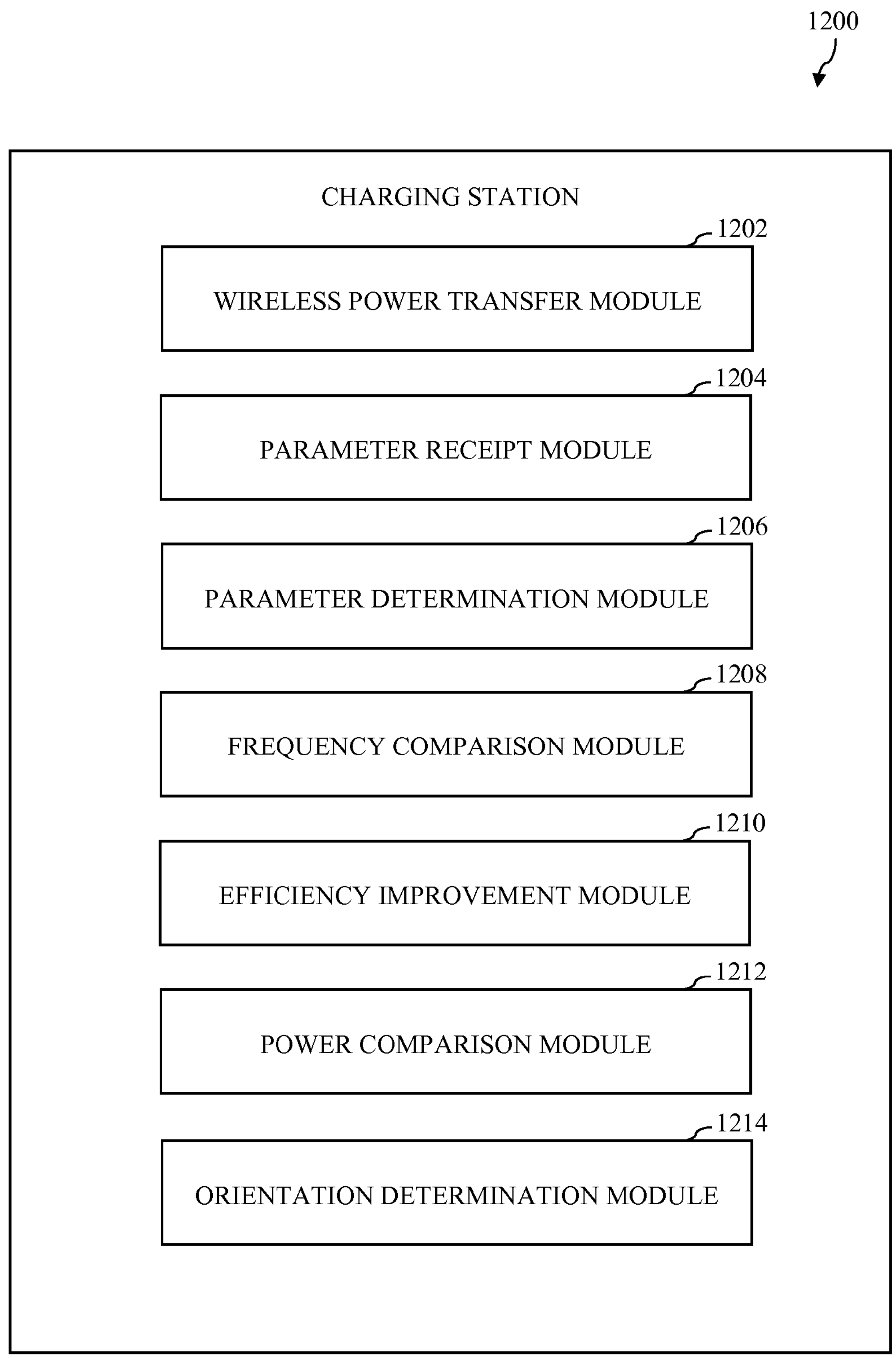

As shown in FIG. 12, charging station 1200 includes a wireless power transfer module 1202, a parameter receipt module 1204, a parameter determination module 1206, a frequency comparison module 1208, an efficiency improvement module 1210, a power comparison module 1212, and an orientation determination module 1214. Further structural and operational embodiments will be apparent to persons skilled in the relevant art(s) based on the discussion regarding flowchart 1100. Flowchart 1100 is described as follows.

As shown in FIG. 11, the method of flowchart 1100 begins at step 1102. In step 1102, a wireless power transfer is initiated from a charging station to a portable electronic device via a wireless power link. In an example implementation, wireless power transfer module 1202 initiates the wireless power transfer via the wireless power link.

At step 1104, a determination is made whether a frequency parameter that specifies a resonant frequency of the portable electronic device is received via a wireless communication link. In an example implementation, parameter determination module 1206 determines whether a frequency parameter that specifies the resonant frequency of the portable electronic device is received. For instance, parameter receipt module 1204 may receive the frequency parameter. If the frequency parameter that specifies the resonant frequency of the portable electronic device is received via the wireless communication link, flow continues to step 1108. Otherwise, flow continues to step 1110.

According to one example embodiment, the wireless power link and the wireless communication link are established via a common inductive link. According to another example embodiment, the wireless power link and the wireless communication link are established via respective inductive links. These example embodiments are provided for illustrative purposes and are not intended to be limiting. For instance, the wireless power link and the wireless communication link need not necessarily be inductive links.

It should be noted that the frequency parameter may specify the resonant frequency of the portable electronic device in relative terms with respect to a reference frequency or in absolute terms. For example, the frequency parameter may specify a resonant frequency that is 5 megahertz (MHz) in relative terms by specifying the resonant frequency to be 3 MHz with respect to a reference frequency of 2 MHz. In another example, the frequency parameter may specify the same resonant frequency of 5 MHz in absolute terms to be 5 MHz, such that the resonant frequency is not specified with respect to a reference frequency.

A reference frequency may be any suitable frequency. For example, a non-radiative magnetic field, which oscillates at an oscillating frequency, may mediate the wireless power transfer. For instance, the charging station may generate the non-radiative magnetic field, and power may be wirelessly transferred from the charging station to the portable electronic device through inductive coupling and/or resonant inductive coupling. In accordance with this example, the oscillating frequency at which the non-radiative magnetic field oscillates may serve as the reference frequency.

At step 1106, a determination is made whether a frequency at which a non-radiative magnetic field that mediates the wireless power transfer oscillates is substantially equal to the resonant frequency of the portable electronic device. In an example implementation, frequency comparison module 1208 determines whether the frequency at which the non-radiative magnetic field oscillates is substantially equal to the resonant frequency of the portable electronic device. If the frequency at which the non-radiative magnetic field oscillates is substantially equal to the resonant frequency of the portable electronic device, flow continues to step 1110. Otherwise, flow continues to step 1108.

At step 1108, the frequency at which the non-radiative magnetic field oscillates is changed to be substantially equal to the resonant frequency of the portable electronic device. In an example implementation, efficiency improvement module 1210 changes the frequency at which the non-radiative magnetic field oscillates. It will be recognized that steps 1106 and 1108 may be omitted if a non-radiative field does not mediate the wireless power transfer.

At step 1110, a determination is made whether a power parameter that specifies a magnitude of power requested by the portable electronic device is received via the wireless communication link. The power parameter may specify the magnitude of power requested by the portable electronic device in relative terms with respect to a reference magnitude of power or in absolute terms. For example, the magnitude of power provided to the portable electronic device with respect to the wireless power transfer from the charging station may serve as the reference magnitude of power. In an example implementation, parameter determination module 1206 determines whether a power parameter that specifies a magnitude requested by the portable electronic device is received via the wireless communication link. For instance, parameter receipt module 1204 may receive the power parameter. If a power parameter that specifies a magnitude of power requested by the portable electronic device is received, flow continues to step 1112 shown in FIG. 11B. Otherwise, flow continues to step 1120 shown in FIG. 11C.

At step 1112, a determination is made whether a magnitude of power that is provided by the charging station with respect to the wireless power transfer is greater than the magnitude of power requested by the portable electronic device. In an example implementation, power comparison module 1212 determines whether the magnitude of power that is provided by the charging station with respect to the wireless power transfer is greater than the magnitude of power requested by the portable electronic device. If the magnitude of power that is provided by the charging station with respect to the wireless power transfer is greater than the magnitude of power requested by the portable electronic device, flow continues to step 1114. Otherwise, flow continues to step 1116.

Figure 11A:
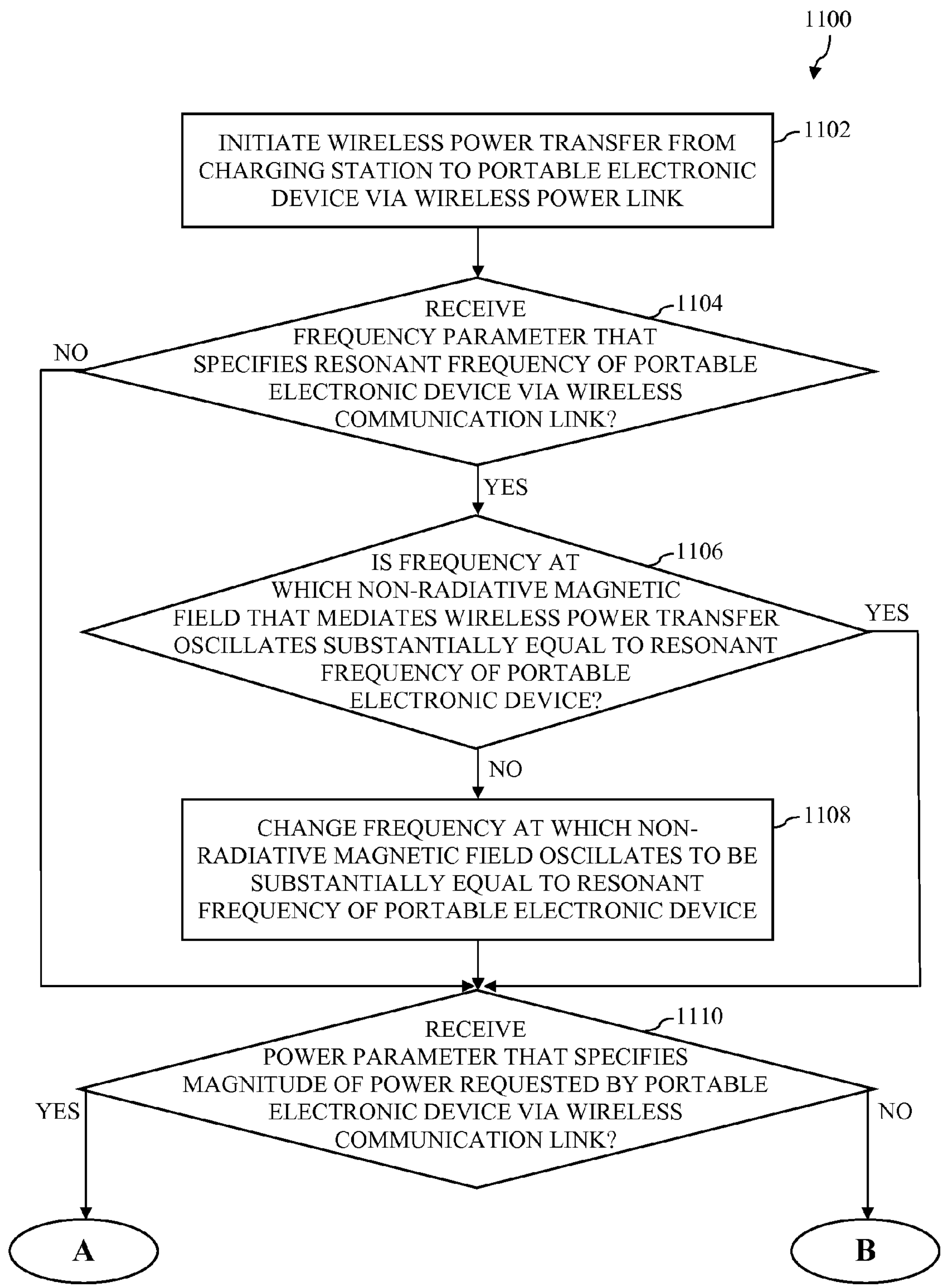
Figure 11B:
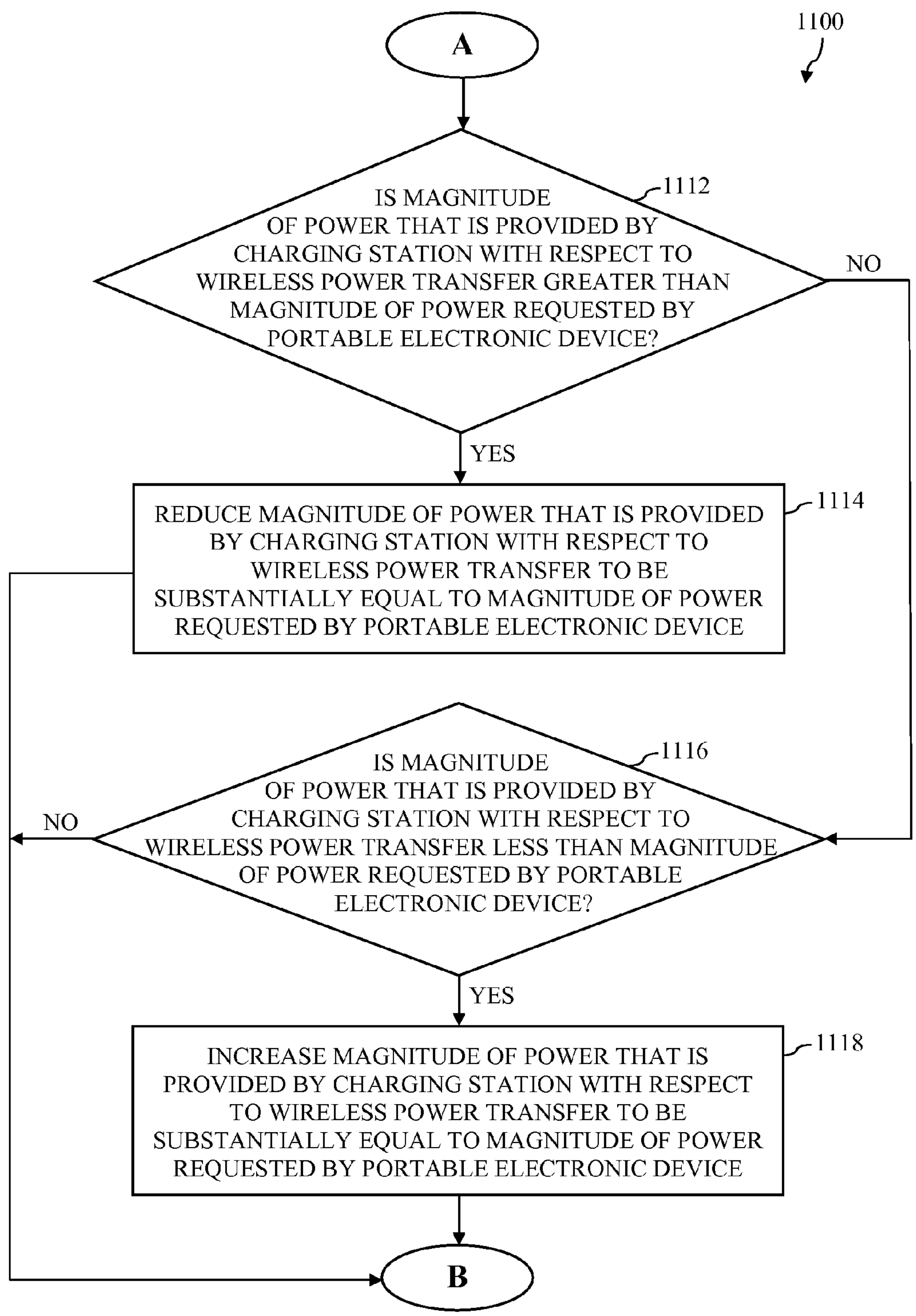
Figure 11C:
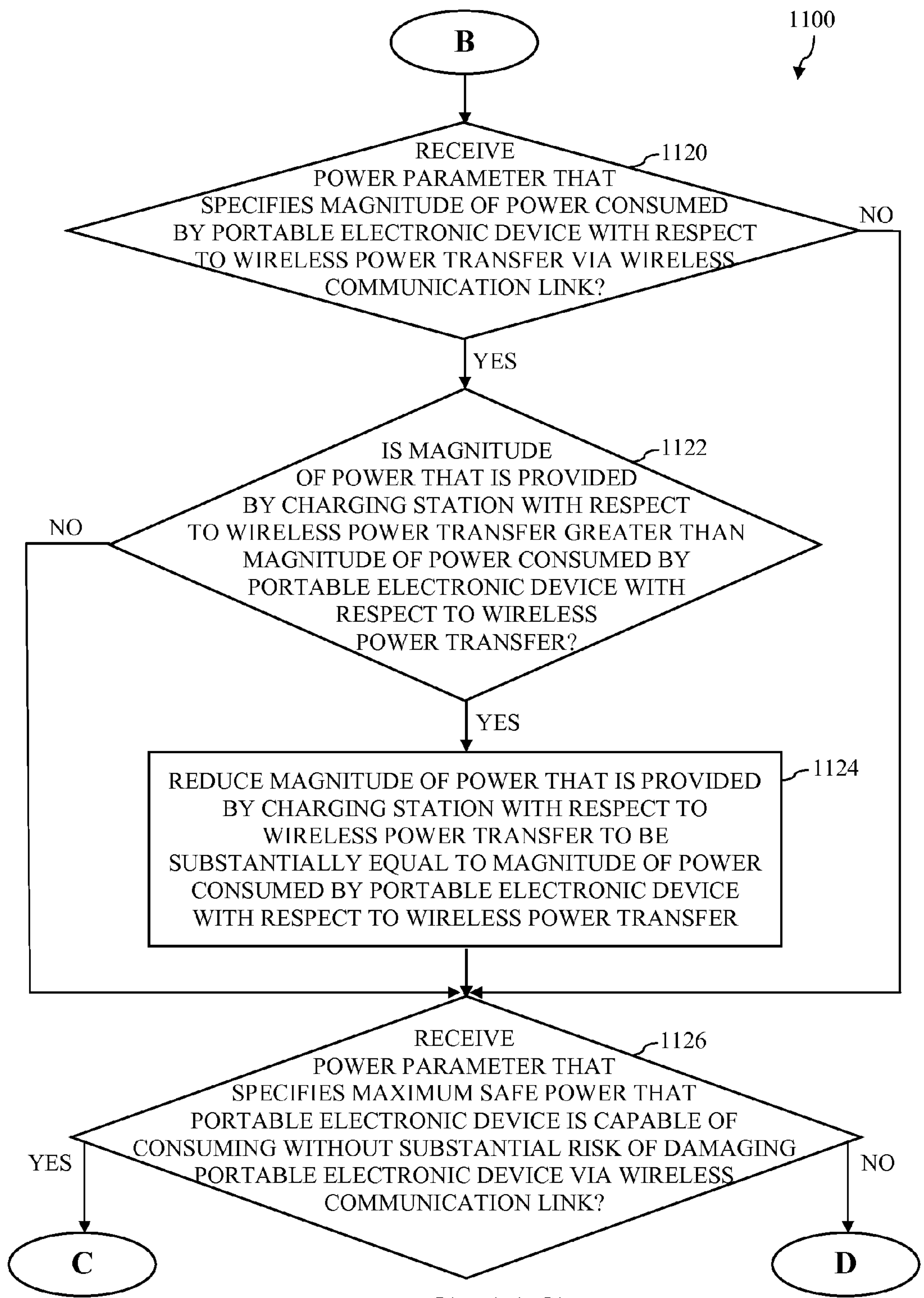

At step 1114, the magnitude of power that is provided by the charging station with respect to the wireless power transfer is reduced to be substantially equal to the magnitude of power requested by the portable electronic device. In an example implementation, efficiency improvement module 1210 reduces the magnitude of power that is provided by the charging station with respect to the wireless power transfer to be substantially equal to the magnitude of power requested by the portable electronic device. Upon completion of step 1114, flow continues to step 1120, which is shown in FIG. 11C.

At step 1116, a determination is made whether the magnitude of power that is provided by the charging station with respect to the wireless power transfer is less than the magnitude of power requested by the portable electronic device. In an example implementation, power comparison module 1212 determines whether the magnitude of power that is provided by the charging station with respect to the wireless power transfer is less than the magnitude of power requested by the portable electronic device. If the magnitude of power that is provided by the charging station with respect to the wireless power transfer is less than the magnitude of power requested by the portable electronic device, flow continues to step 1118. Otherwise, flow continues to step 1120, which is shown in FIG. 11C.

At step 1118, the magnitude of power that is provided by the charging station with respect to the wireless power transfer is increased to be substantially equal to the magnitude of power requested by the portable electronic device. In an example implementation, efficiency improvement module 1210 increases the magnitude of power that is provided by the charging station with respect to the wireless power transfer to be substantially equal to the magnitude of power requested by the portable electronic device.

Persons skilled in the relevant art(s) will recognize that it may not be desirable to increase the magnitude of power that is provided by the charging station with respect to the wireless power transfer even if a determination is made that such magnitude of power is less than the magnitude of power requested by the portable electronic device. For example, efficiency of the wireless power transfer may be better served by not increasing the magnitude of power that is provided by the charging station with respect to the wireless power transfer. Accordingly, step 1118 need not necessarily be performed in response to an affirmative determination at step 1116.

Upon completion of step 1118, flow continues to step 1120, which is shown in FIG. 11C. At step 1120, a determination is made whether a power parameter that specifies a magnitude of power consumed by the portable electronic device with respect to the wireless power transfer is received via the wireless communication link. The power parameter may specify the magnitude of power consumed by the portable electronic device in relative terms with respect to a reference magnitude of power or in absolute terms. For example, the magnitude of power provided to the portable electronic device with respect to the wireless power transfer from the charging station may serve as the reference magnitude of power. In an example implementation, parameter determination module 1206 determines whether a power parameter that specifies the magnitude of power consumed by the portable electronic device with respect to the wireless power transfer is received via the wireless communication link. For instance, parameter receipt module 1204 may receive the power parameter. If a power parameter that specifies the magnitude of power consumed by the portable electronic device with respect to the wireless power transfer is received, flow continues to step 1122. Otherwise, flow continues to step 1126.

At step 1122, a determination is made whether the magnitude of power that is provided by the charging station with respect to the wireless power transfer is greater than the magnitude of power consumed by the portable electronic device with respect to the wireless power transfer. In an example implementation, power comparison module 1212 determines whether the magnitude of power that is provided by the charging station with respect to the wireless power transfer is greater than the magnitude of power consumed by the portable electronic device with respect to the wireless power transfer. If the magnitude of power that is provided by the charging station with respect to the wireless power transfer is greater than the magnitude of power consumed by the portable electronic device with respect to the wireless power transfer, flow continues to step 1124. Otherwise, flow continues to step 1126.

At step 1124, the magnitude of power that is provided by the charging station with respect to the wireless power transfer is reduced to be substantially equal to the magnitude of power consumed by the portable electronic device with respect to the wireless power transfer. In an example implementation, efficiency improvement module 1210 reduces the magnitude of power that is provided by the charging station with respect to the wireless power transfer.

Figure 11D:
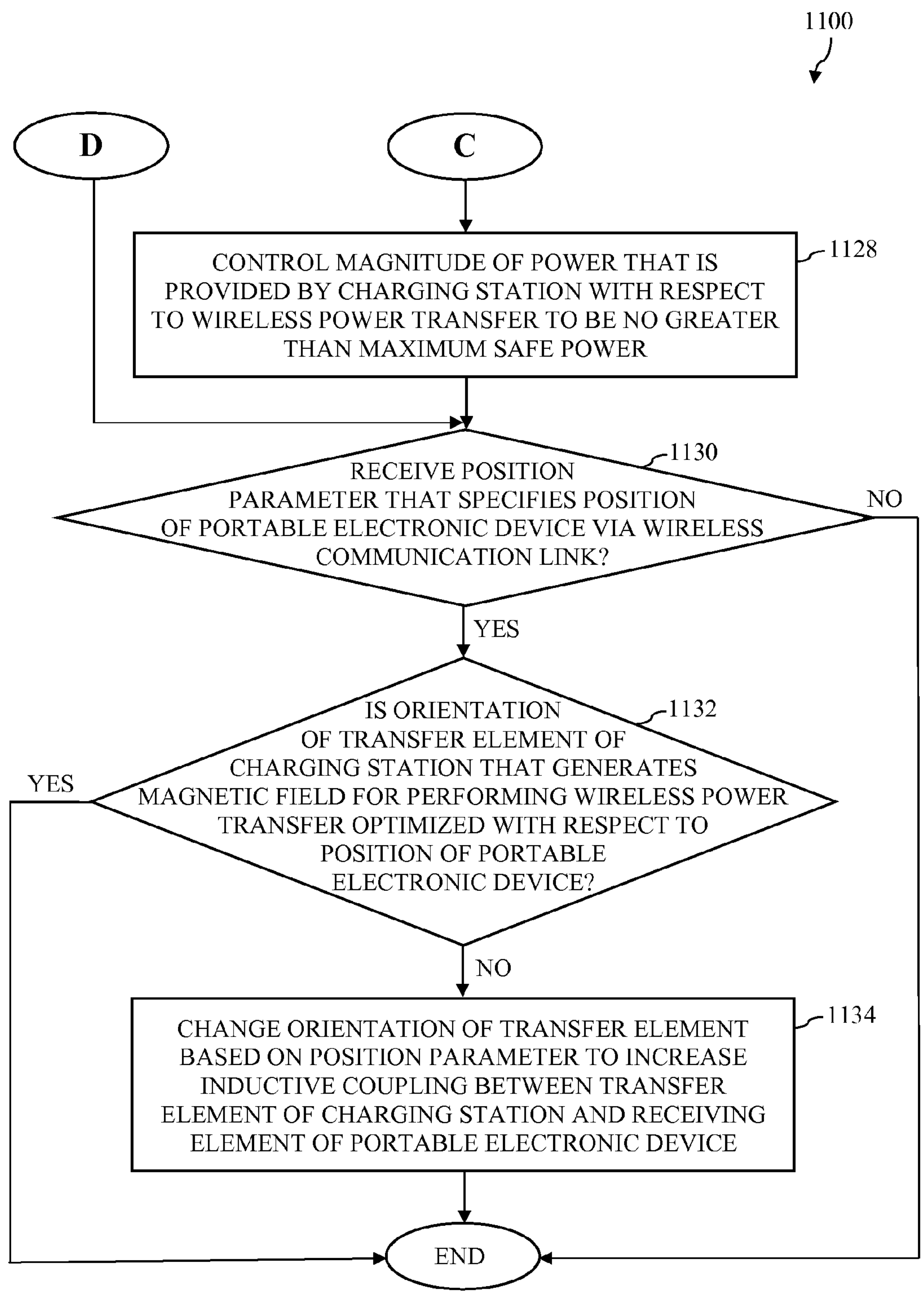

At step 1126, a determination is made whether a power parameter that specifies a maximum safe power that the portable electronic device is capable of consuming without substantial risk of damaging the portable electronic device is received via the wireless communication link. In an example implementation, parameter determination module 1206 determines whether a power parameter that specifies the maximum safe power is received via the wireless communication link. For instance, parameter receipt module 1204 may receive the power parameter. If a power parameter that specifies the maximum safe power is received, flow continues to step 1128, which is shown in FIG. 11D. Otherwise, flow continues to step 1130, which is also shown in FIG. 11D.

The substantial risk of damage may be defined as a relatively high likelihood that performance of the portable electronic device will become substantially hindered, that the portable electronic device will become inoperable, or any other suitable definition. The power parameter may specify the maximum safe power in relative terms with respect to a reference magnitude of power or in absolute terms. For example, the magnitude of power provided to the portable electronic device with respect to the wireless power transfer from the charging station may serve as the reference magnitude of power.

At step 1128, the magnitude of power that is provided by the charging station with respect to the wireless power transfer is controlled to be no greater than the maximum safe power. For instance, if the magnitude of power that is provided by the charging station with respect to the wireless power transfer is greater than the maximum safe power before performance of step 1128, the magnitude of power that is provided by the charging station with respect to the wireless power transfer may be reduced at step 1128 to be no greater than the maximum safe power. If the magnitude of power that is provided by the charging station with respect to the wireless power transfer is less than or equal to the maximum safe power before performance of step 1128, the magnitude of power that is provided by the charging station with respect to the wireless power transfer may be maintained at step 1128 to be no greater than the maximum safe power. In an example implementation, efficiency improvement module 1210 controls the magnitude of power that is provided by the charging station with respect to the wireless power to be no greater than the maximum safe power.

At step 1130, a determination is made whether a position parameter that specifies a position of the portable electronic device is received via the wireless communication link. The position parameter may specify the position of the portable electronic device in relative terms with respect to a reference position or in absolute terms. For example, the position of the charging station may serve as the reference position. In an example implementation, parameter determination module 1206 determines whether a position parameter that specifies a position of the portable electronic device is received via the wireless communication link. If a position parameter that specifies a position of the portable electronic device is received, flow continues to step 1136. Otherwise, flowchart 1100 ends.

At step 1132 a determination is made whether an orientation of a transfer element of the charging station that generates the magnetic field for performing the wireless power transfer is optimized with respect to the position of the portable electronic device. For instance, the transfer element may be a coil through which a current is provided to generate the magnetic field for performing the wireless power transfer. In an example implementation, orientation determination module 1214 determines whether the orientation of the transfer element is optimized with respect to the position of the portable electronic device. If the orientation of the transfer element is optimized with respect to the position of the portable electronic device, flowchart 1100 ends. Otherwise, flow continues to step 1134.

At step 1134, the orientation of the transfer element is changed based on the position parameter to increase inductive coupling between the transfer element of the charging station and a receiving element of the portable electronic device. For instance, changing the orientation of the transfer element may include but is not limited to moving the transfer element vertically, horizontally, or in another direction; rotating the transfer element; etc. In an example implementation, efficiency improvement module 1210 changes the orientation of the transfer element. It will be recognized that steps 1130, 1132, and 1134 may be omitted if the charging station does not generate a magnetic field for performing the wireless power transfer.

In some example embodiments, one or more steps 1102, 1104, 1106, 1108, 1110, 1112, 1114, 1116, 1118, 1120, 1122, 1124, 1126, 1128, 1130, 1132, and/or 1134 of flowchart 1100 may not be performed. Moreover, steps in addition to or in lieu of steps 1102, 1104, 1106, 1108, 1110, 1112, 1114, 1116, 1118, 1120, 1122, 1124, 1126, 1128, 1130, 1132, and/or 1134 may be performed.

It will be recognized that charging station 1200 may not include one or more of wireless power transfer module 1202, parameter receipt module 1204, parameter determination module 1206, frequency comparison module 1208, efficiency improvement module 1210, power comparison module 1212, and/or orientation determination module 1214. Furthermore, charging station 1200 may include modules in addition to or in lieu of wireless power transfer module 1202, parameter receipt module 1204, parameter determination module 1206, frequency comparison module 1208, efficiency improvement module 1210, power comparison module 1212, and/or orientation determination module 1214.

Figure 13:
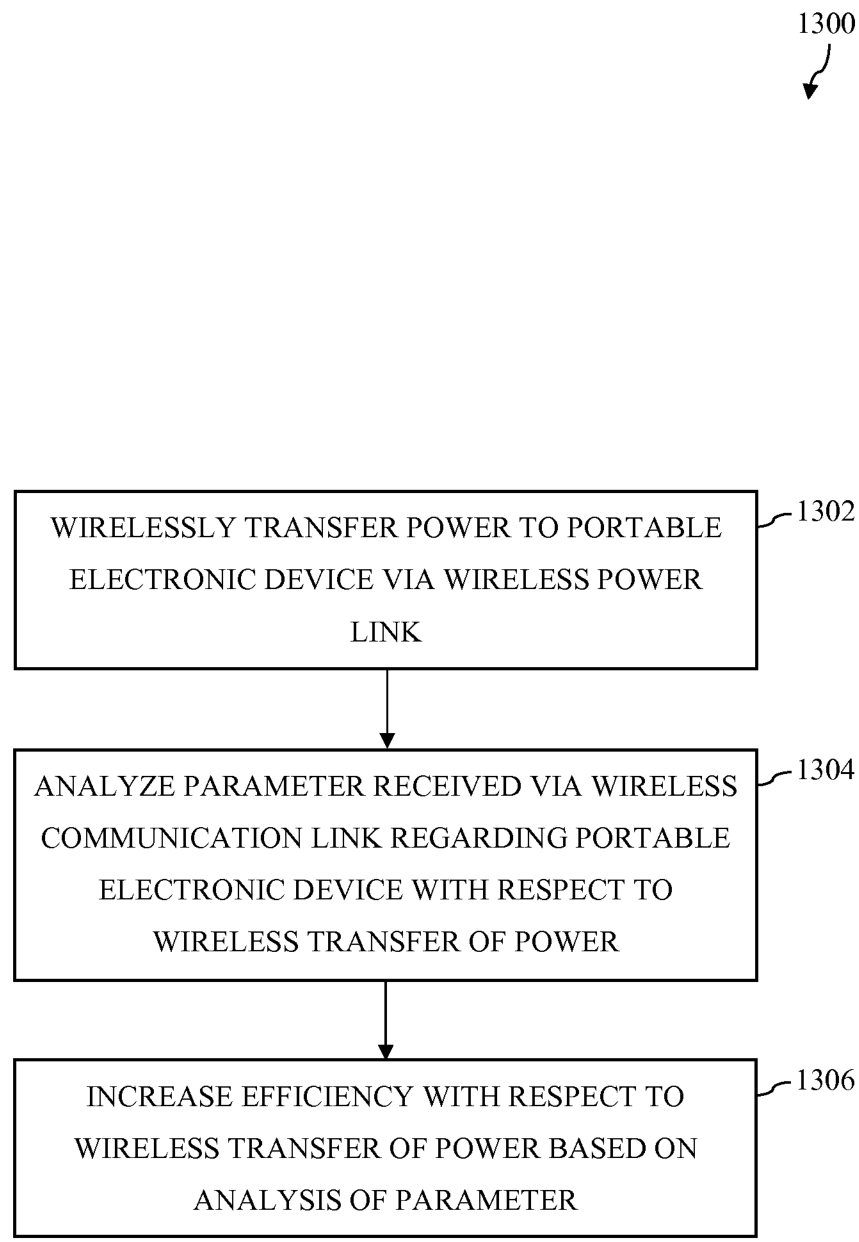

FIG. 13 depicts a flowchart 1300 of a method for increasing efficiency of wireless power transfer in accordance with an embodiment described herein. Flowchart 1300 may be performed by charging station 102, 602, 702, or 802 of respective wireless power transfer system 100, 600, 700, or 800 shown in respective FIG. 1, 6, 7, or 8, for example. For illustrative purposes, flowchart 1300 is described with respect to a charging system 1400 shown in FIG. 14, which is an example of a charging station 102, 602, 702, or 802, according to an embodiment.

Figure 14:
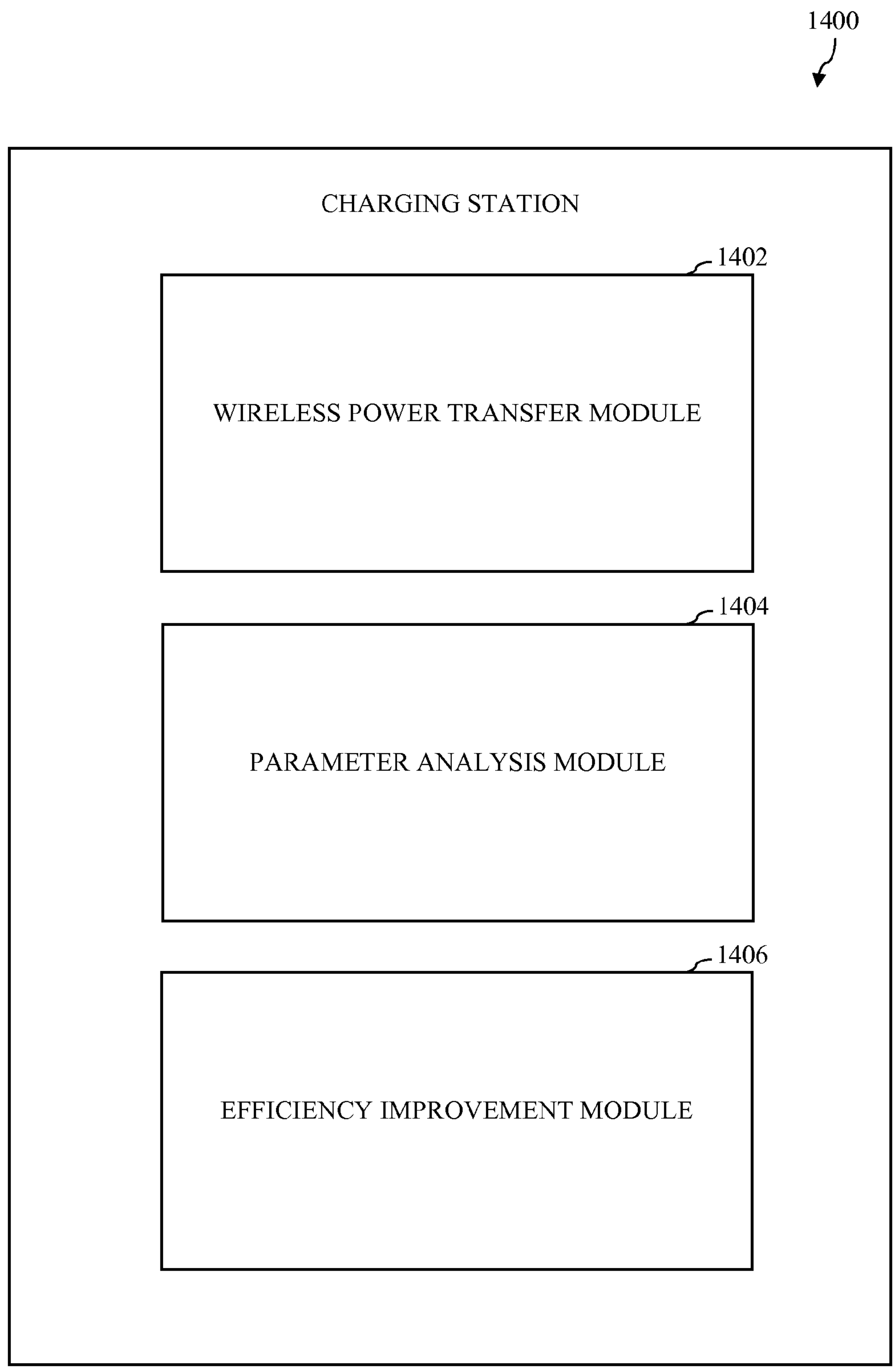

As shown in FIG. 14, charging station 1400 includes a wireless power transfer module 1402, a parameter analysis module 1404, and an efficiency improvement module 1406. Further structural and operational embodiments will be apparent to persons skilled in the relevant art(s) based on the discussion regarding flowchart 1300. Flowchart 1300 is described as follows.

As shown in FIG. 13, the method of flowchart 1300 begins at step 1302. In step 1302, power is wirelessly transferred to a portable electronic device via a wireless power link. In an example implementation, wireless power transfer module 1402 wirelessly transfers the power to the portable electronic device via the wireless power link.

At step 1304, a parameter received via a wireless communication link regarding the portable electronic device with respect to the wireless transfer of the power is analyzed. For instance, the analysis may include but is not limited to comparing the parameter to a reference parameter to determine whether the parameter and the reference parameter are substantially same; comparing the parameter to a range of parameters to determine whether the parameter is within the range; comparing the parameter to a threshold to determine whether the parameter reaches the threshold; perform a mathematical operation with respect to the parameter to estimate the efficiency with respect to the wireless transfer of power; etc. In an example implementation, parameter analysis module 1404 analyzes the parameter received via the wireless communication link.

At step 1306, efficiency with respect to the wireless power transfer of the power is increased based on analysis of the parameter. In an example implementation, efficiency improvement module 1406 increases the efficiency with respect to the wireless transfer of the power.

Figure 15:
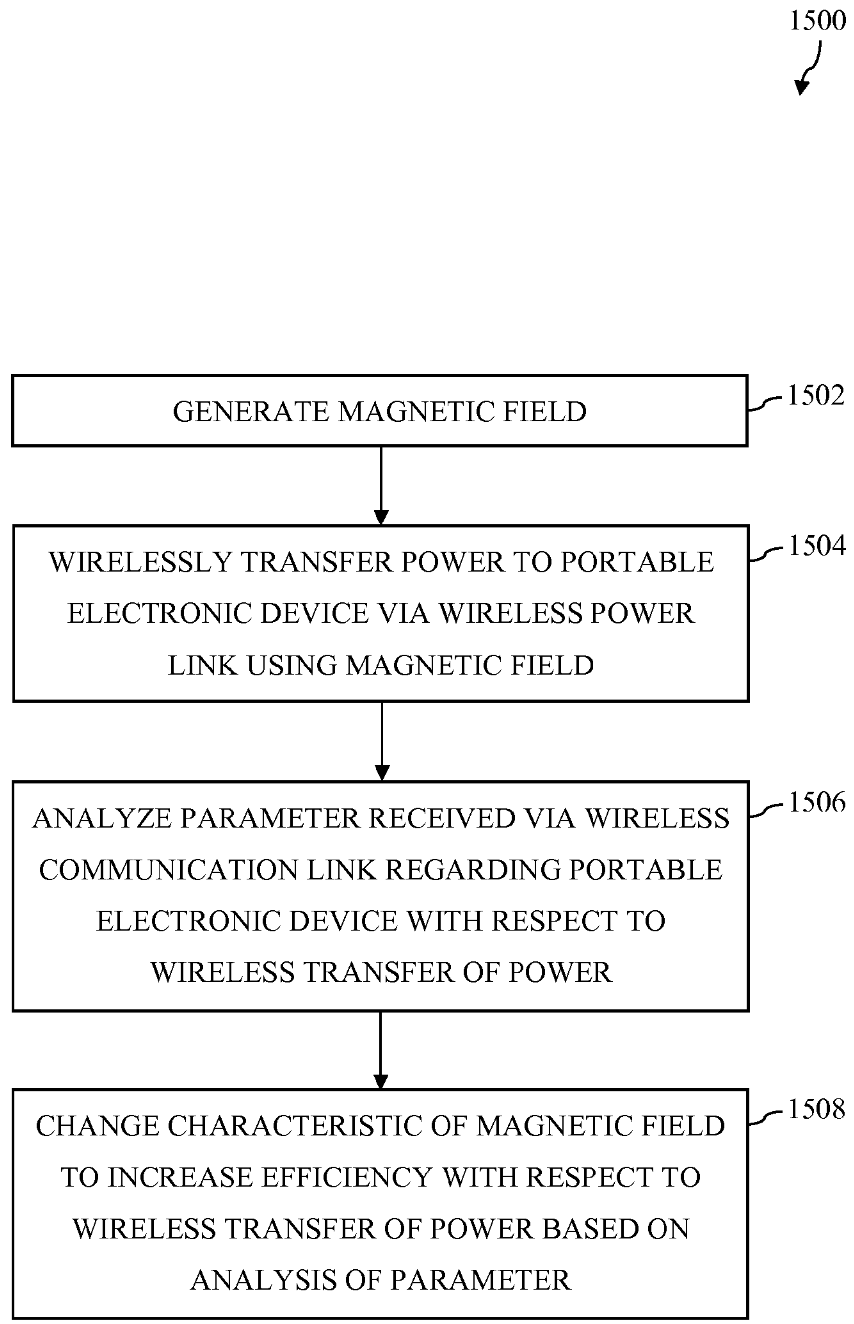

FIG. 15 depicts a flowchart 1500 of a method for increasing efficiency of wireless power transfer in accordance with an embodiment described herein. Flowchart 1500 may be performed by charging station 102, 602, 702, or 802 of respective wireless power transfer system 100, 600, 700, or 800 shown in respective FIG. 1, 6, 7, or 8, for example. For illustrative purposes, flowchart 1500 is described with respect to a charging system 1600 shown in FIG. 16, which is an example of a charging station 102, 602, 702, or 802, according to an embodiment.

Figure 16:
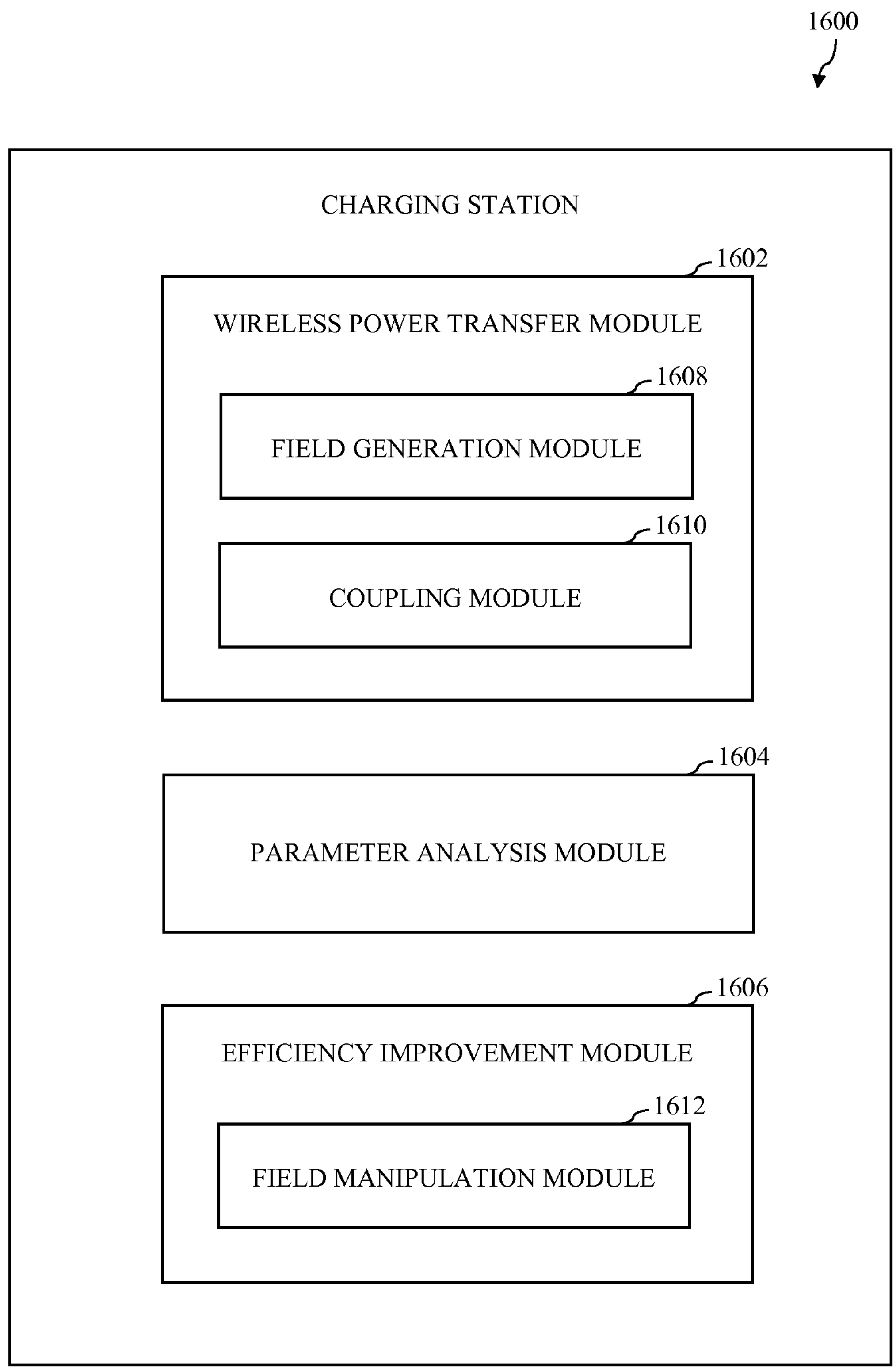

As shown in FIG. 16, charging station 1600 includes a wireless power transfer module 1602, a parameter analysis module 1604, and an efficiency improvement module 1606. Wireless power transfer module 1602 includes a field generation module 1608 and a coupling module 1610. Efficiency improvement module 1606 includes a field manipulation module 1612. Further structural and operational embodiments will be apparent to persons skilled in the relevant art(s) based on the discussion regarding flowchart 1500. Flowchart 1500 is described as follows.

As shown in FIG. 15, the method of flowchart 1500 begins at step 1502. In step 1502, a magnetic field is generated. In an example implementation, field generation module 1608 generates the magnetic field. For instance, field generation module 1608 may include coil through which a current is provided to generate the magnetic field. The field may be a non-radiative magnetic field, though the scope of the example embodiments is not limited in this respect.

At step 1504, power is wirelessly transferred to a portable electronic device via a wireless power link using the magnetic field. For example, the magnetic field may couple with a coil in the portable electronic device that is configured to be responsive to the magnetic field. In accordance with this example, the power may be wirelessly transferred in accordance with an inductive coupling technique, a resonant inductive coupling technique, or any other suitable technique. In an example implementation, coupling module 1610 wirelessly transfers the power to the portable electronic device.

At step 1506, a parameter received via a wireless communication link regarding the portable electronic device with respect to the wireless transfer of the power is analyzed. In an example implementation, parameter analysis module 1604 analyzes the parameter received via the wireless communication link.

At step 1508, a characteristic of the magnetic field is changed to increase efficiency with respect to the wireless transfer of the power based on analysis of the parameter. The characteristic may include but is not limited to a magnitude of the magnetic field, a directionality associated with the magnetic field, a frequency at which the magnetic field oscillates, etc. In an example implementation, field manipulation module 1612 changes the characteristic of the magnetic field to increase the efficiency with respect to the wireless transfer of the power.

FIGS. 17-21 depict flowcharts 1700, 1800, 1900, 2000, and 2100 of methods for increasing efficiency of wireless power transfer in accordance with embodiments described herein. Each of flowcharts 1700, 1800, 1900, 2000, and 2100 may be performed by portable electronic device 104, 604, 704, or 804 of respective wireless power transfer system 100, 600, 700, or 800 shown in respective FIG. 1, 6, 7, or 8, for example. For illustrative purposes, flowcharts 1700, 1800, 1900, 2000, and 2100 are described with respect to portable electronic device 2200 shown in FIG. 22, which is an example of a portable electronic device 104, 604, 704, or 804, according to an embodiment.

As shown in FIG. 22, portable electronic device 2200 includes a wireless power receipt module 2202 and a parameter module 2204. Further structural and operational embodiments will be apparent to persons skilled in the relevant art(s) based on the discussion regarding flowcharts 1700, 1800, 1900, 2000, and 2100. Flowcharts 1700, 1800, 1900, 2000, and 2100 are described in the following discussion.

Figure 17:
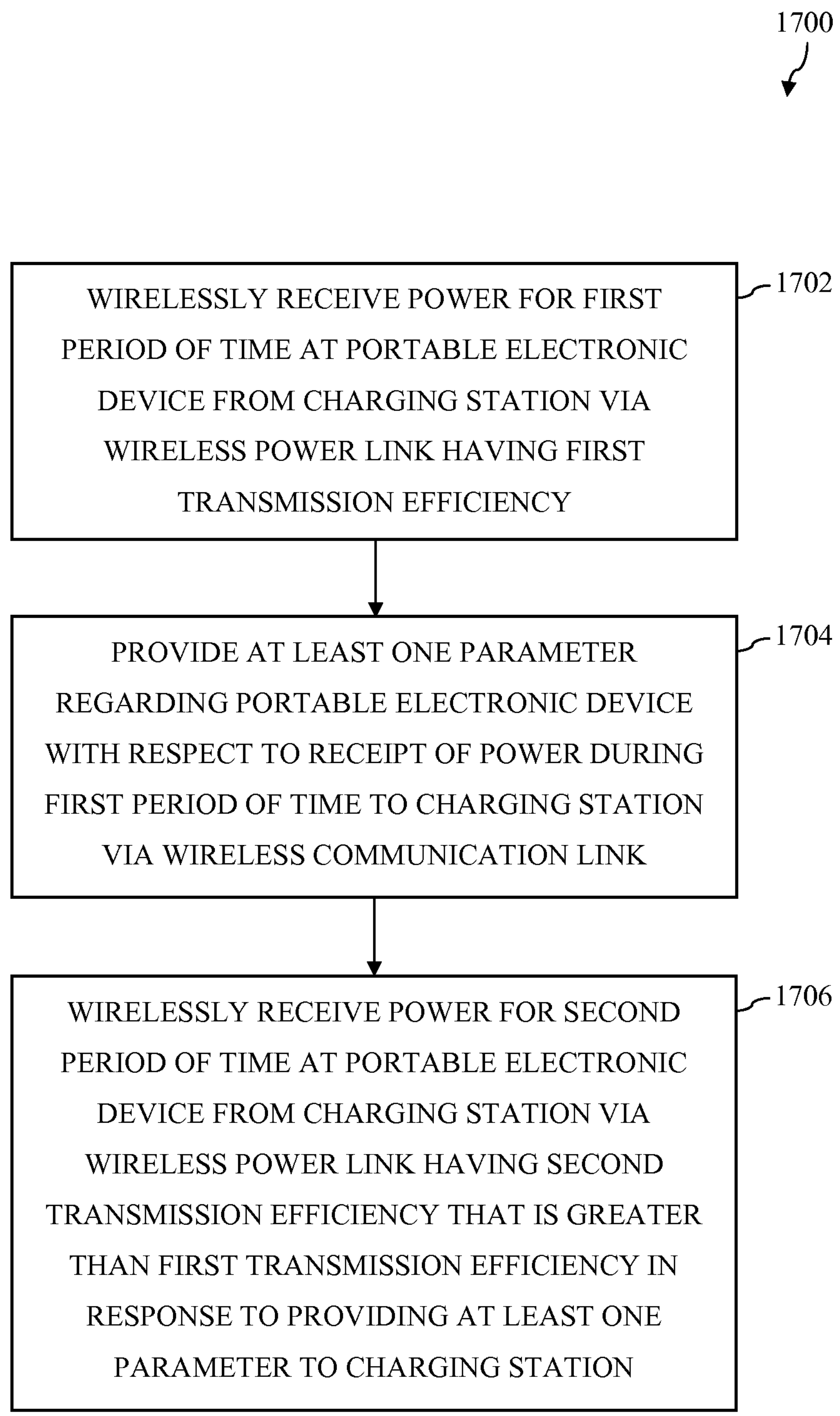

As shown in FIG. 17, the method of flowchart 1700 begins at step 1702. In step 1702, power is wirelessly received for a first period of time at a portable electronic device from a charging station via a wireless power link having a first transmission efficiency. Wirelessly receiving power for the first period of time may be performed in accordance with an inductive coupling technique, a resonant inductive coupling technique, or any other suitable technique. In an example implementation, wireless power receipt module 2202 wirelessly receives power for the first period of time.

At step 1704, at least one parameter regarding the portable electronic device with respect to receipt of power during the first period of time is provided to the charging station via a wireless communication link. For instance, the at least one parameter may be provided to the charging station via the wireless communication link in accordance with a Near Field Communication (NFC) protocol, a Bluetooth™ protocol, a ZigBee® protocol, an IEEE 802.11 protocol, or any other suitable protocol. The wireless power link and the wireless communication link may be implemented as separate links or as a common link. The wireless power link and the wireless communication link may be inductive links, though the scope of the example embodiments is not limited in this respect. In an example implementation, parameter module 2204 provides the at least one parameter to the charging station.

At step 1706, power is wirelessly received for a second period of time at the portable electronic device from the charging station via the wireless power link having a second transmission efficiency that is greater than the first transmission efficiency in response to providing the at least one parameter to the charging station. Wirelessly receiving power for the second period of time may be performed in accordance with an inductive coupling technique, a resonant inductive coupling technique, or any other suitable technique. In an example implementation, wireless power receipt module 2202 wirelessly receives power for the second period of time.

Figure 18:
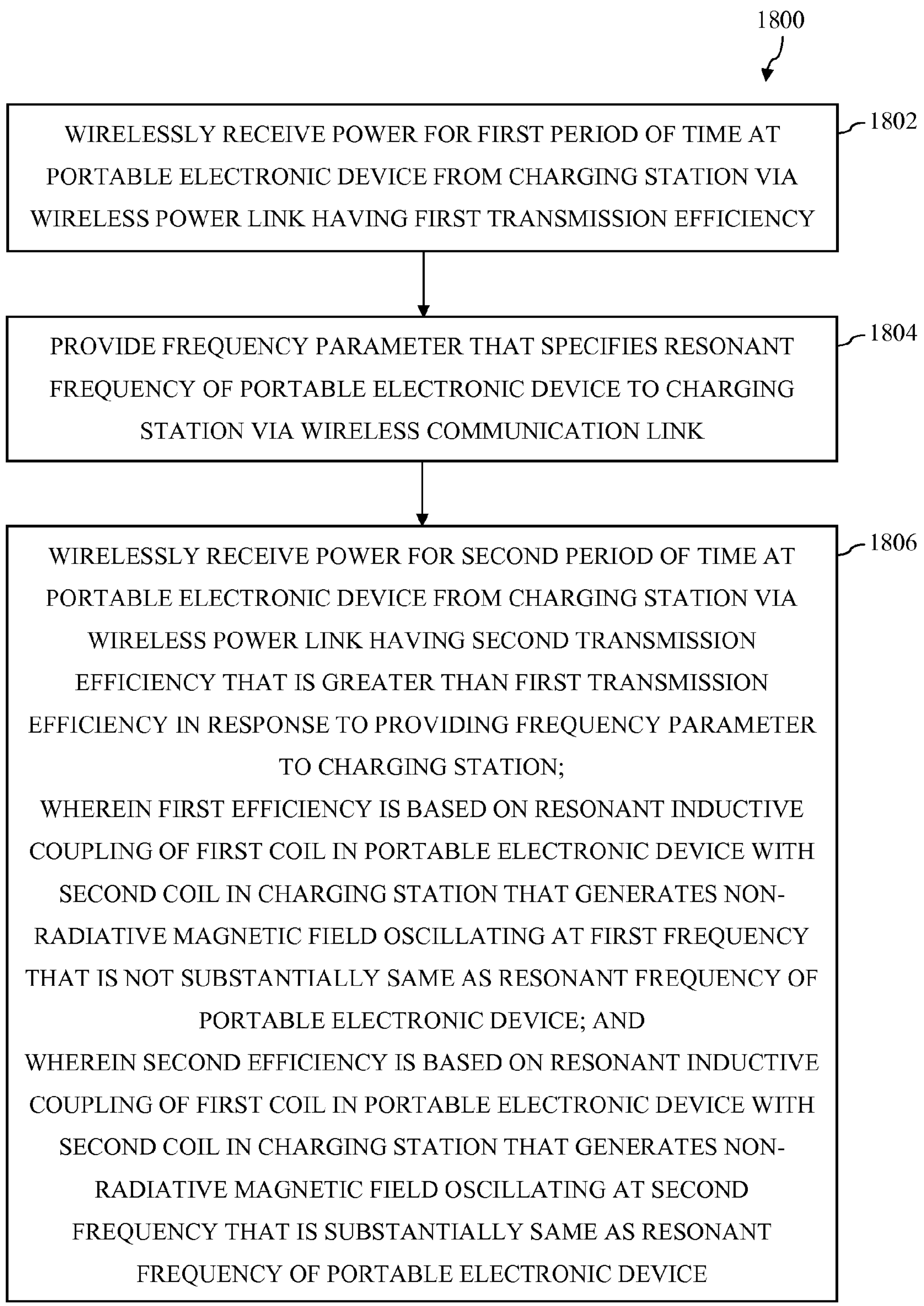

As shown in FIG. 18, the method of flowchart 1800 begins at step 1802. In step 1802, power is wirelessly received for a first period of time at a portable electronic device from a charging station via a wireless power link having a first transmission efficiency. In an example implementation, wireless power receipt module 2202 wirelessly receives power for the first period of time.

At step 1804, a frequency parameter that specifies a resonant frequency of the portable electronic device is provided to charging station via a wireless communication link. The frequency parameter may specify the resonant frequency in relative terms with respect to a reference frequency or in absolute terms. In an example implementation, parameter module 2204 provides the frequency parameter to the charging station.

At step 1806, power is wirelessly received for a second period of time at the portable electronic device from the charging station via the wireless power link having a second transmission efficiency that is greater than the first transmission efficiency in response to providing the frequency parameter to the charging station. The first efficiency is based on resonant inductive coupling of a first coil in the portable electronic device with a second coil in the charging station that generates a non-radiative magnetic field oscillating at a first frequency that is not substantially same as the resonant frequency of the portable electronic device. The second efficiency is based on resonant inductive coupling of the first coil in the portable electronic device with the second coil in the charging station that generates a non-radiative magnetic field oscillating at a second frequency that is substantially same as the resonant frequency of the portable electronic device. In an example implementation, wireless power receipt module 2202 wirelessly receives power for the second period of time.

Figure 19:
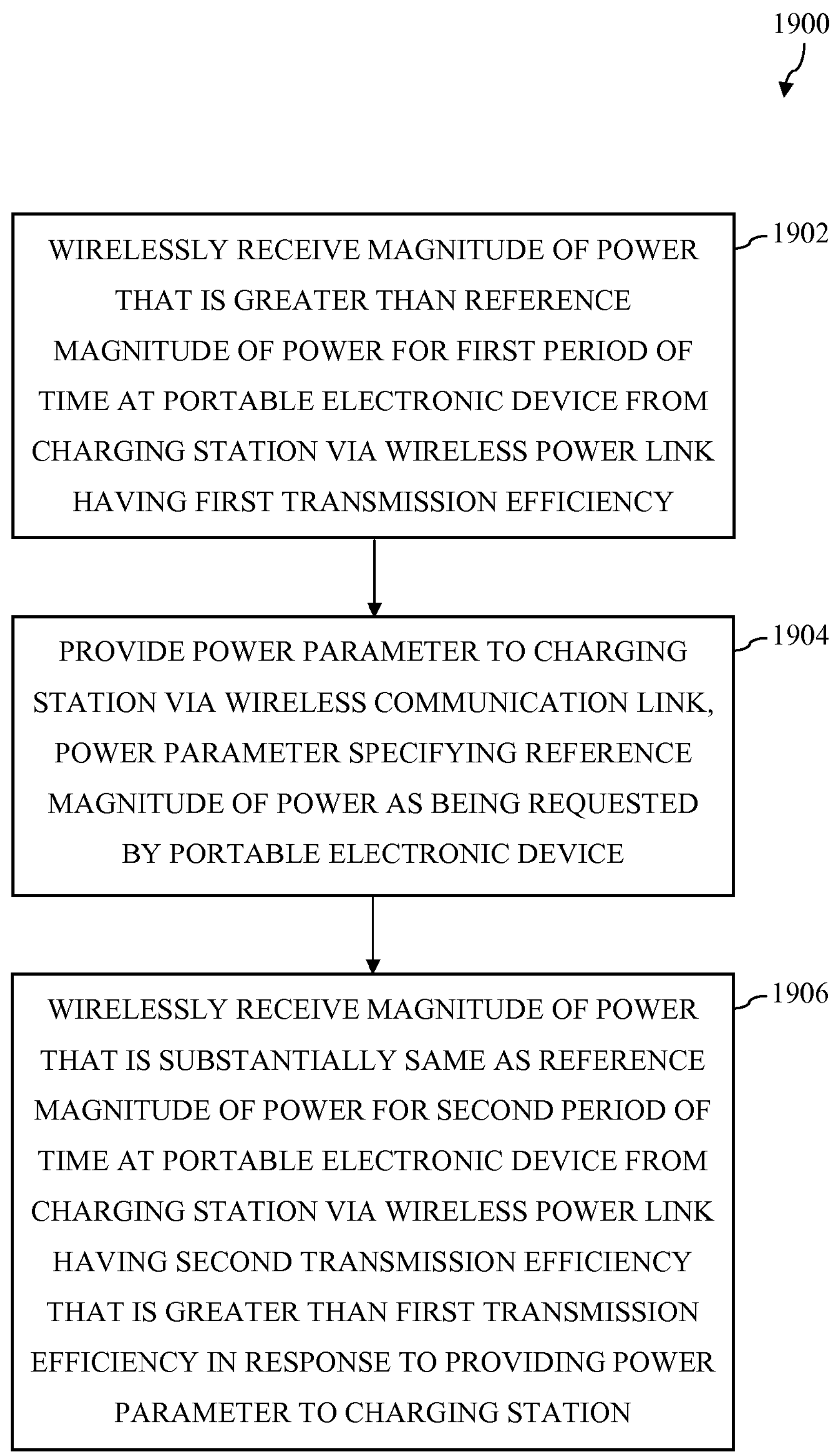

As shown in FIG. 19, the method of flowchart 1900 begins at step 1902. In step 1902, a magnitude of power that is greater than a reference magnitude of power is wirelessly received for a first period of time at a portable electronic device from a charging station via a wireless power link having a first transmission efficiency. In an example implementation, wireless power receipt module 2202 wirelessly receives the magnitude of power that is greater than the reference magnitude of power for the first period of time.

At step 1904, a power parameter is provided to the charging station via a wireless communication link. The power parameter specifies the reference magnitude of power as being requested by the portable electronic device. The power parameter may specify the reference magnitude of power in relative terms with respect to a second reference magnitude of power or in absolute terms. For example, the magnitude of power wirelessly received for the first period of time at the portable electronic device may serve as the second reference magnitude of power. In an example implementation, parameter module 2204 provides the power parameter to the charging station.

At step 1906, a magnitude of power that is substantially same as the reference magnitude of power is wirelessly received for a second period of time at the portable electronic device from the charging station via the wireless power link having a second transmission efficiency that is greater than the first transmission efficiency in response to providing the power parameter to the charging station. In an example implementation, wireless power receipt module 2202 wirelessly receives the magnitude of power that is substantially same as the reference magnitude of power for the second period of time.

Figure 20:
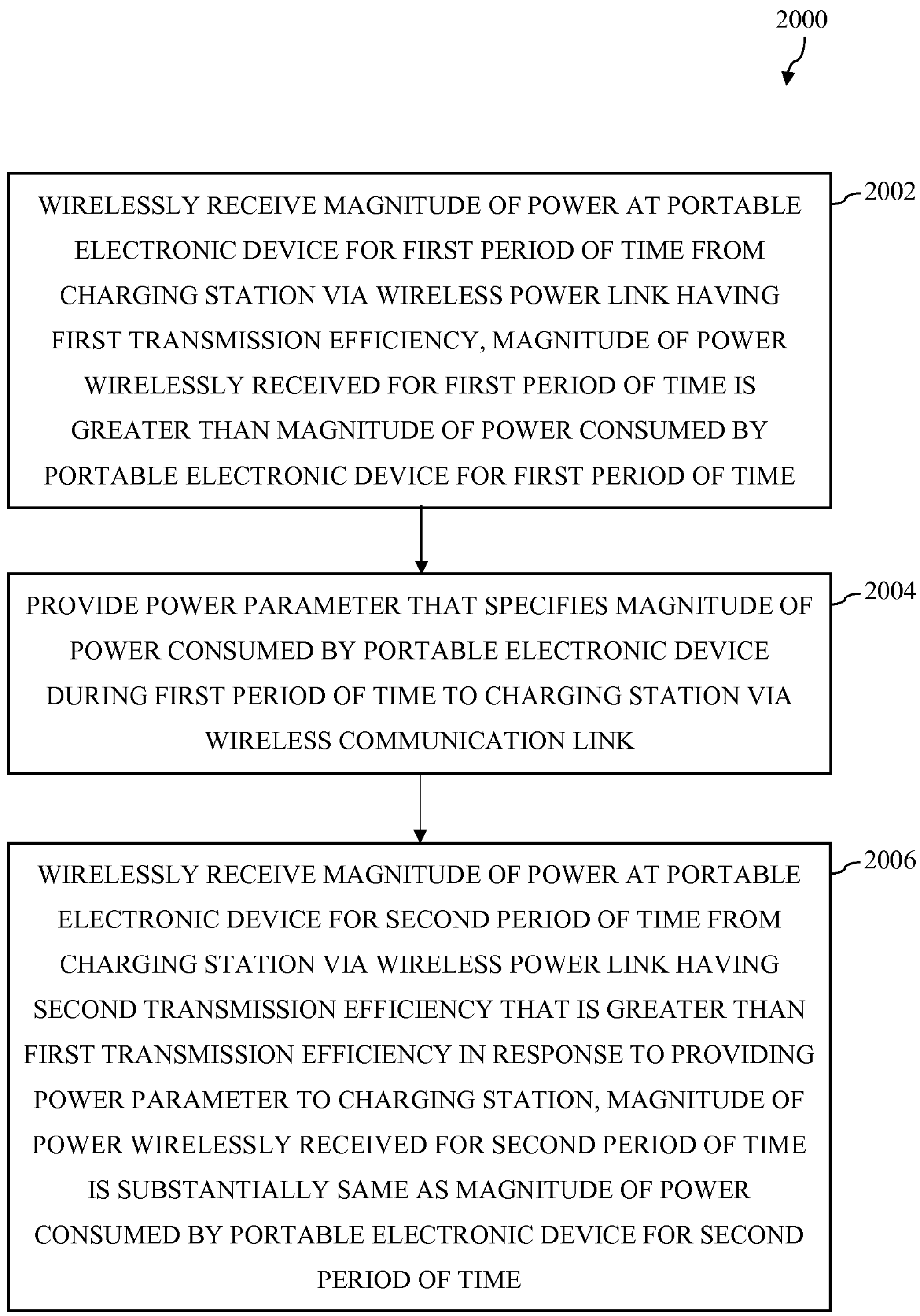

As shown in FIG. 20, the method of flowchart 2000 begins at step 2002. In step 2002, a magnitude of power is wirelessly received at a portable electronic device for a first period of time from a charging station via a wireless power link having a first transmission efficiency. The magnitude of power wirelessly received for the first period of time is greater than a magnitude of power consumed by the portable electronic device for the first period of time. In an example implementation, wireless power receipt module 2202 wirelessly receives the magnitude of power for the first period of time.

At step 2004, a power parameter that specifies the magnitude of power consumed by the portable electronic device during the first period of time is provided to the charging station via a wireless communication link. The power parameter may specify the magnitude of power consumed by the portable electronic device during the first period of time in relative terms with respect to a reference magnitude of power or in absolute terms. For example, the magnitude of power wirelessly received at the portable electronic device for the first period of time may serve as the reference magnitude of power. In an example implementation, parameter module 2204 provides the power parameter to the charging station.

At step 2006, a magnitude of power is wirelessly received at the portable electronic device for a second period of time from the charging station via the wireless power link having a second transmission efficiency that is greater than the first transmission efficiency in response to providing the power parameter to the charging station. The magnitude of power wirelessly received for the second period of time is substantially same as the magnitude of power consumed by the portable electronic device for the second period of time. In an example implementation, wireless power receipt module 2202 wirelessly receives the magnitude of power for the second period of time.

Figure 21:
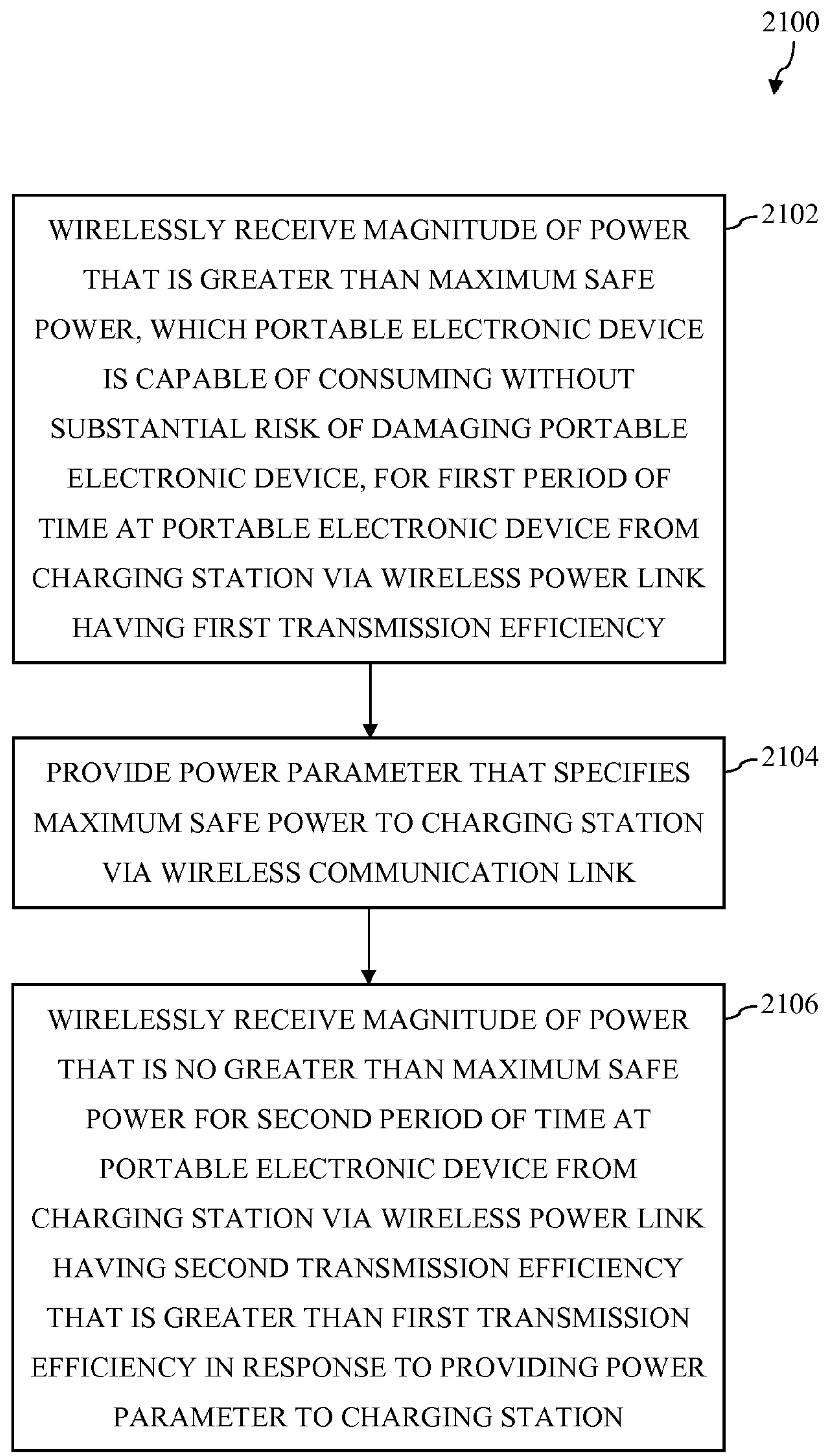

As shown in FIG. 21, the method of flowchart 2100 begins at step 2102. In step 2102, a magnitude of power that is greater than a maximum safe power, which a portable electronic device is capable of consuming without substantial risk of damaging the portable electronic device, is wirelessly received for a first period of time at the portable electronic device from a charging station via a wireless power link having a first transmission efficiency. In an example implementation, wireless power receipt module 2202 wirelessly receives the magnitude of power for the first period of time.

At step 2104, a power parameter that specifies the maximum safe power is provided to the charging station via a wireless communication link. The power parameter may specify the maximum safe power in relative terms with respect to a reference magnitude of power or in absolute terms. For example, the magnitude of power wirelessly received for the first period of time at the portable electronic device may serve as the reference magnitude of power. In an example implementation, parameter module 2204 provides the power parameter that specifies the maximum safe power to the charging station.

At step 2106, a magnitude of power that is no greater than the maximum safe power is wirelessly received for a second period of time at the portable electronic device from the charging station via the wireless power link having a second transmission efficiency that is greater than the first transmission efficiency in response to providing the power parameter to the charging station. In an example implementation, wireless power receipt module 2202 wirelessly receives the magnitude of power for the second period of time.

V. Conclusion

While various embodiments have been described above, it should be understood that they have been presented by way of example only, and not limitation. It will be understood by those skilled in the relevant art(s) that various changes in form and details may be made to the embodiments described herein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method comprising:

initiating a wireless power transfer from a charging station to a portable electronic device via a wireless power link;

receiving at least one parameter regarding the portable electronic device at the charging station via a wireless communication link in response to initiation of the wireless power transfer, the at least one parameter including a frequency parameter that specifies a resonant frequency of the portable electronic device; and increasing efficiency of the wireless power transfer based on the at least one parameter, wherein increasing the efficiency of the wireless power transfer includes changing a frequency at which a non-radiative magnetic field, which mediates the wireless power transfer, oscillates to be substantially equal to the resonant frequency of the portable electronic device.

2. The method of claim 1, wherein the at least one parameter further includes a power parameter that specifies a magnitude of power requested by the portable electronic device; and wherein increasing the efficiency of the wireless power transfer further includes reducing a magnitude of power that is provided by the charging station with respect to the wireless power transfer to be substantially equal to the magnitude of power requested by the portable electronic device.

3. The method of claim 1, wherein the at least one parameter further includes a power parameter that specifies a magnitude of power consumed by the portable electronic device with respect to the wireless power transfer; and wherein increasing the efficiency of the wireless power transfer further includes reducing a magnitude of power that is provided by the charging station with respect to the wireless power transfer to be substantially equal to the magnitude of power consumed by the portable electronic device with respect to the wireless power transfer.

4. The method of claim 1, wherein the at least one parameter further includes a power parameter that specifies a maximum safe power that the portable electronic device is capable of consuming without substantial risk of damaging the portable electronic device; and wherein increasing the efficiency of the wireless power transfer further includes controlling a magnitude of power that is provided by the charging station with respect to the wireless power transfer to be no greater than the maximum safe power.

5. The method of claim 1, wherein the at least one parameter further includes a position parameter that specifies a position of the portable electronic device; and wherein increasing the efficiency of the wireless power transfer further includes changing an orientation of a transfer element of the charging station that generates a magnetic field for performing the wireless power transfer based on the position parameter to increase inductive coupling between the transfer element of the charging station and a receiving element of the portable electronic device.

6. The method of claim 1, wherein receiving the at least one first parameter includes receiving the at least one parameter at the charging station via the wireless communication link in accordance with a Near Field Communication (NFC) protocol, a Bluetooth™ protocol, a ZigBee® protocol, or an IEEE 802.11 protocol.

7. The method of claim 1, wherein wirelessly transferring power from the charging station to the portable electronic device via the wireless power link is performed in accordance with an inductive coupling technique.

8. The method of claim 1, wherein wirelessly transferring power from the charging station to the portable electronic device via the wireless power link is performed in accordance with a resonant inductive coupling technique.

9. The method of claim 1, further comprising:

establishing the wireless power link and the wireless communication link via a common inductive link.

10. A system comprising:

a wireless power transfer component configured to wirelessly transfer power to a portable electronic device via a wireless power link;

a parameter analysis component configured to analyze at least one parameter received via a wireless communication link regarding the portable electronic device with respect to the wireless transfer of the power, the parameter analysis component including a field generation component configured to generate a magnetic field that is used to wirelessly transfer the power to the portable electronic device, the at least one parameter including a first parameter that specifies a resonant frequency of the portable electronic device; and an efficiency improvement component configured to increase efficiency with respect to the wireless transfer of the power based on analysis of the at least one parameter, the efficiency improvement component including a field manipulation component configured to change a characteristic of the magnetic field to increase the efficiency with respect to the wireless transfer of the power based on the analysis of the at least one parameter, the field manipulation component being configured to change a frequency at which the magnetic field oscillates to be substantially equal to the resonant frequency of the portable electronic device specified by the first parameter.

11. The system of claim 10, wherein the at least one parameter includes a second parameter that specifies a magnitude of power requested by the portable electronic device; and wherein the efficiency improvement component is configured to reduce a magnitude of the power that is provided with respect to the wireless transfer to be substantially equal to the magnitude of power requested by the portable electronic device.

12. The system of claim 10, wherein the at least one parameter includes a second parameter that specifies a magnitude of power consumed by the portable electronic device with respect to the wireless transfer of the power; and wherein the efficiency improvement component is configured to reduce a magnitude of the power that is provided with respect to the wireless transfer to be substantially equal to the magnitude of power consumed by the portable electronic device with respect to the wireless transfer.

13. The system of claim 10, wherein the at least one parameter includes a second parameter that specifies a maximum safe power that the portable electronic device is capable of consuming without substantial risk of damaging the portable electronic device; and wherein the efficiency improvement component is configured to control a magnitude of the power that is provided with respect to the wireless transfer to be no greater than the maximum safe power.

14. A system comprising:

a wireless power transfer component configured to wirelessly transfer power to a portable electronic device via a wireless power link, the wireless power transfer component including a transfer element that generates a magnetic field for performing the wireless transfer of the power;

a parameter analysis component configured to analyze at least one parameter received via a wireless communication link regarding the portable electronic device with respect to the wireless transfer of the power, the at least one parameter including a position parameter that specifies a position of the portable electronic device; and an efficiency improvement component configured to increase efficiency with respect to the wireless transfer of the power based on analysis of the at least one parameter, the efficiency improvement component being configured to change an orientation of the transfer element based on the position parameter to increase inductive coupling between the transfer element and a receiving element of the portable electronic device.

15. The system of claim 10, wherein the wireless power transfer component is configured to wirelessly transfer the power from the charging station to the portable electronic device via the wireless power link in accordance with an inductive coupling technique.

16. The system of claim 10, wherein the wireless power transfer component is configured to wirelessly transfer the power from the charging station to the portable electronic device via the wireless power link in accordance with a resonant inductive coupling technique.

17. The system of claim 10, wherein the wireless power link and the wireless communication link are included in a common inductive link.

18. The system of claim 14, wherein the wireless communication link is configured to transmit the at least one parameter in accordance with a Near Field Communication (NFC) protocol, a Bluetooth™ protocol, a ZigBee® protocol, or an IEEE 802.11 protocol.

19. The system of claim 14, wherein the wireless power transfer component is configured to wirelessly transfer the power from the charging station to the portable electronic device via the wireless power link in accordance with an inductive coupling technique.

20. The system of claim 14, wherein the wireless power transfer component is configured to wirelessly transfer the power from the charging station to the portable electronic device via the wireless power link in accordance with a resonant inductive coupling technique.

21. The system of claim 14, wherein the wireless power link and the wireless communication link are included in a common inductive link.

* * * * *